(12) United States Patent
Conry

(10) Patent No.: US 11,416,013 B2
(45) Date of Patent: Aug. 16, 2022

(54) MICRO CHILLER-BASED HEATING, VENTILATION AND AIR CONDITIONING SYSTEM

(71) Applicant: Conry Tech Holdings Pty. Ltd., Victoria (AU)

(72) Inventor: Ronald David Conry, Tallahassee, FL (US)

(73) Assignee: Conry Tech Holdings Pty. Ltd., Victoria (AU)

(*) Notice: Subject to any disclaimer, the term of this patent is extended or adjusted under 35 U.S.C. 154(b) by 104 days.

(21) Appl. No.: 17/001,818

(22) Filed: Aug. 25, 2020

(65) Prior Publication Data

US 2021/0132640 A1    May 6, 2021

Related U.S. Application Data

(60) Provisional application No. 62/891,581, filed on Aug. 26, 2019.

(51) Int. Cl.
| | |
|---|---|
| *F25B 7/00* | (2006.01) |
| *F25B 41/20* | (2021.01) |
| *G05D 23/19* | (2006.01) |
| *F24F 11/30* | (2018.01) |
| *F24D 19/10* | (2006.01) |

(52) U.S. Cl.
CPC ..... *G05D 23/1928* (2013.01); *F24D 19/1006* (2013.01); *F24F 11/30* (2018.01); *F25B 7/00* (2013.01); *F25B 41/20* (2021.01); *F25B 2313/003* (2013.01); *F25B 2313/004* (2013.01); *F25B 2313/0231* (2013.01); *F25B 2313/0233* (2013.01)

(58) Field of Classification Search
CPC .... F25B 41/24; F25B 41/26; F25B 2313/004; F24F 11/67; F24F 2221/54; F24D 19/1006; G05D 23/1928
USPC .......................................................... 62/181
See application file for complete search history.

(56) References Cited

U.S. PATENT DOCUMENTS

2015/0300709 A1* 10/2015 Yamashita .............. F25B 41/00
 62/190
2016/0356531 A1* 12/2016 Cline ...................... F25B 30/06

* cited by examiner

*Primary Examiner* — Jerry-Daryl Fletcher
*Assistant Examiner* — Daniel C Comings
(74) *Attorney, Agent, or Firm* — J. Wiley Horton

(57) ABSTRACT

A heating, ventilation, and air conditioning system in which a primary water loop is used as a heat transfer reservoir for both heating and cooling. A plurality of micro chillers are provided, with each micro chiller being connected to the primary water loop. Each micro chiller includes its own heat engine. Each micro chiller includes one or more fan control units that exchange heat between the micro chiller and the air in a building. In a first mode a micro chiller transfers heat from the air in the building to the water circulating within the primary water loop. In a second mode the micro chiller transfers heat from the water circulating in the primary water loop to the air in the building. A primary water loop regulation system is provided to control the temperature of the water circulating in the primary water loop.

19 Claims, 25 Drawing Sheets

(Fig. 1)
Prior Art

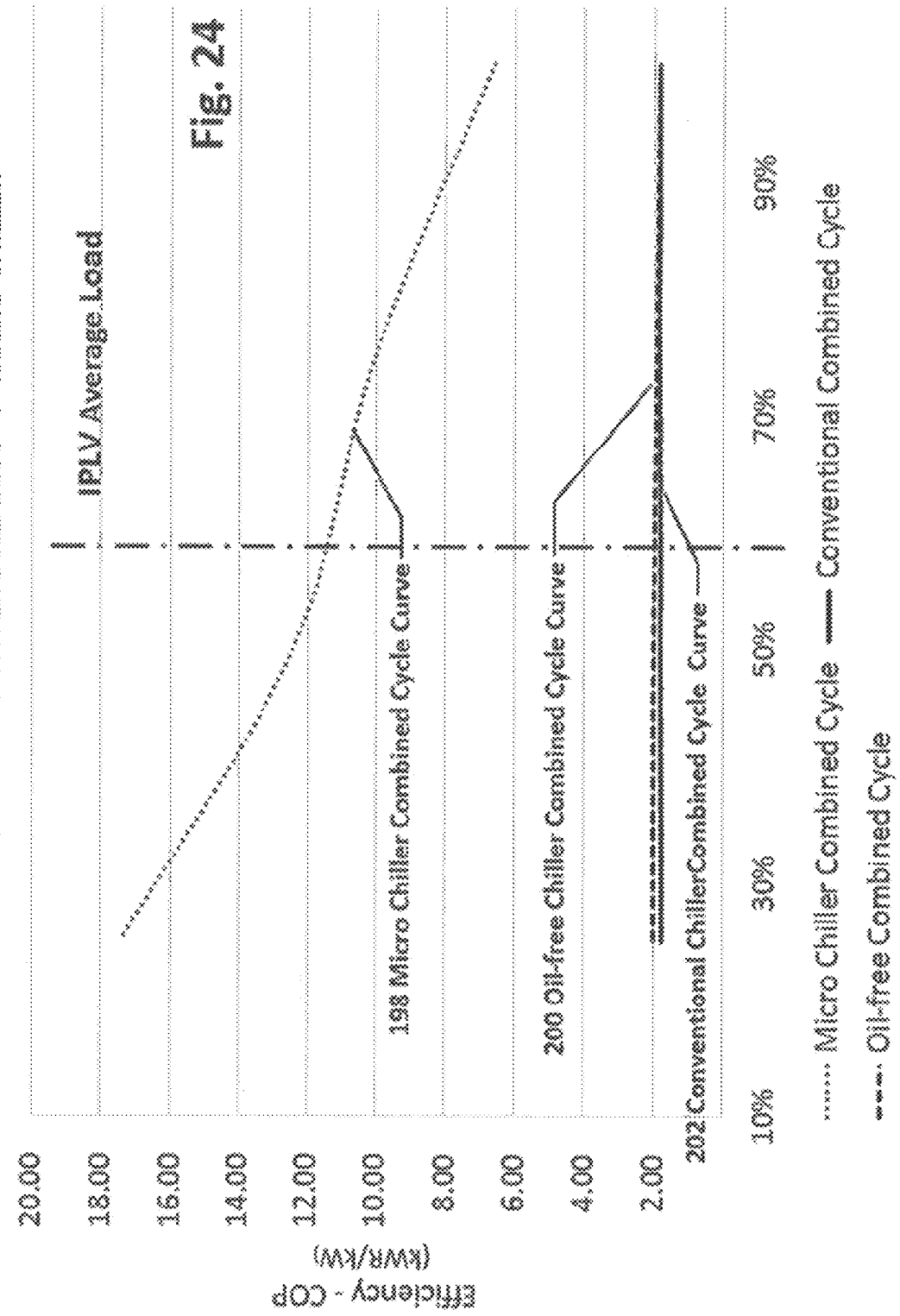

MICRO CHILLER-BASED HEATING, VENTILATION AND AIR CONDITIONING SYSTEM

CROSS-REFERENCES TO RELATED APPLICATIONS

This non-provisional patent application claims the benefit of an earlier-filed provisional application. The provisional application listed the same inventor. It was filed on Aug. 26, 2019 and was assigned Ser. No. 62/891,581.

STATEMENT REGARDING FEDERALLY SPONSORED RESEARCH OR DEVELOPMENT

Not applicable

MICROFICHE APPENDIX

Not Applicable

BACKGROUND OF THE INVENTION

1. Field of the Invention

This invention relates to the field of heating, ventilation, and air conditioning. More specifically, the invention comprises a novel system in which local micro chillers are used in the place of a centralized heating and cooling plant.

2. Description of the Related Art

The present invention can be used in buildings of differing sizes and configurations. Commercial structures will be a common application and the reader's understanding will benefit from a brief explanation of the existing systems used for such buildings. The reader should bear in mind that many different types of systems are presently in use. The following explanation pertains to only one exemplary prior art system. It will serve adequately, however, as a baseline understanding of the prior art and will help the reader understand the advantages of the present invention.

FIG. 1 depicts a multi-story building 10. Heating, ventilation, and air-conditioning ("HVAC") is provided by large, centralized units. Chiller plant 14 and hot water plant 16 are located on the roof, or in large, below-ground equipment spaces. The chiller plant chills water that is then circulated throughout the building to provide cooling as needed. Heat is rejected from the chiller plant via cooling tower 24—located on the roof. The cooled water is circulated through a cold water loop (not shown in FIG. 1).

Hot water plant 16 heats water than is then circulated throughout the building in a hot water loop. The hot water loop is separate from the cold water loop. Each floor 12 contains one or more air handlers 18. An air duct system 20 extends from each air handler 18. Cold water is provided to each air handler 18 via the cold water loop and hot water is provided to each air handler via the hot water loop. In some systems the hot and cold water is blended within or near the air handler. In other systems a separate hot water coil and cold water coil is provided within each air handler and the hot and cold water supplies remain separate.

The temperatures required for the hot water and cold water loops in the example of FIG. 1 are dictated by the maximum possible cooling and heating loads. As an example, the cold water loop must be cold enough so that the maximum cooling required of any one air handler can be met. For large commercial buildings it is customary to cool the water in the cold water loop to about 7 degrees centigrade (45 degrees Fahrenheit). This provides adequate cooling capacity for the peak demand that can occur at any one air handler within the building. The peak demand occurs quite rarely, and the maintenance of the cold water loop at such a low temperature greatly reduces the overall efficiency of the prior art system.

The water in the hot water loop is typically maintained about 50-60 degrees centigrade (122-140 degrees Fahrenheit). This temperature provides adequate capacity for the peak heating load at any one air handler. As for the cold water loop, the peak demand occurs rarely and the maintenance of the hot water at such an elevated temperature introduces inefficiency.

FIGS. 2-4 provide additional details regarding the prior art system shown in FIG. 1. FIG. 2 shows an exemplary configuration for the chiller plant, cooling tower, and cold water loop. There are various heat engine cycles used in chiller plants. In the example of FIG. 2, a compressor-based cycle is used. Chiller plant 14 is typically a vapor-compression refrigeration system. Input power 34 supplies electricity to the compressor and the controlling electronics. The heat engine within the chiller plant chills the water circulating in cold water loop 28 and heats the water circulating within cooling tower circuit 32.

Circulation pump 26 moves the water within cold water loop 28 through air handlers 18. If cooling is needed, the cold water flow through a particular air handler is activated and a fan within the air handler moves air over a heat exchanger ("coil") through which the cold water is pumped. This interaction cools the air and the cooled air is then circulated through an attached air duct system. Flow control valves are used to control the flow of cold water through any particular air handler. These valves are not shown in FIG. 2.

Pump 30 conveys the heated water within cooling tower circuit 32 up to cooling tower 24—which is mounted on the roof in this example. The cooling tower can be an open-loop evaporative type or a closed loop type. In either case, heat carried by the water in cooling tower circuit 32 is transferred to air that is pulled through the cooling tower. The cooled water then travels back down to chiller plant 14.

FIG. 3 shows an exemplary hot water loop 40. Hot water plant 16 is often called a "boiler" but in this example hot water is circulated as the heating medium (some systems do use steam). In the example shown, natural gas is fed to the plant through gas inlet 36 and exhaust gasses are carried away by flue 38. The natural gas is burned to heat the water circulating in hot water loop 40. Circulation pump 27 circulates the heated water throughout the building.

In this example, each air handler 18 can receive hot water as needed. Flow control valves are used to control the flow of hot water through any particular air handler. As for the cold water example, these valves are not shown in FIG. 3. In some systems the flow of hot and cold water can be adjusted separately through each air handler. Other systems simply turn the flow on or off, and regulate the heat transfer by adjusting the fan speed and or the "dwell" of the water flow.

FIG. 4 shows additional details of one air handler 18 on one floor of the building. Main fan 44 drives air through the air handler and over a coil (heat exchanger) that is connected to the hot water loop and a coil that is connected to the cold water loop. The air is fed to the air handler from two sources. The first is recirculation air taken in though one or more recirculation registers 71. The second air source is outside air taken in through intake 46.

The flow rate of cold water from cold water loop 28 through the air handler is regulated in this example by throttling valve 58. The flow rate of hot water from hot water loop 40 is regulated by throttling valve 56. Air flow is regulated by air valves 50, 52, 54. An overall control system regulates these components. Operational modes and features include the following:

1. The throttling valves are limited in their operating range so a desired temperature can be set in the air handler by allowing a full flow of cold water and a limited flow of hot water;

2. A desired blend of fresh air can be provided by operating for an interval with air valve 52 completely closed and air valves 50 and 54 open. In this mode recirculation fan 42 is activated to blow the recirculated air out exhaust 48. Main fan 44 is operated to pull external air in through intake 46.

3. A renewable filter is provided for intake 46.

4. A blend of recirculated and fresh air can be distributed through distribution duct 74 and delivery registers 72 by closing air valve 50 and throttling air valves 52 and 54.

5. Intake 46 may be one or more large trunks feeding the entire building, rather than a single intake for each air handler or floor.

6. Exhaust 48 may be a single exhaust for the entire building with all air handlers feeding into the single exhaust.

Of course, most floors in most larger buildings will have more than one air handler. FIG. 5 provides a plan view of a single floor 70. Solar loads are usually significant in commercial buildings. On many days the side of a floor facing the sun will require air conditioning while the shady side of the same floor may require heat. It is customary to divide a floor such as shown in FIG. 5 into five HVAC zones. These are: center zone 60, east zone 62, north zone 64, west zone 66, and south zone 68. A separate air handler is typically provided for each of these zones.

FIG. 6 shows the same floor plan with the addition of five air handlers and their associated duct work. The air handlers are: central zone air handlers 76, east zone air handler 78, north zone air handler 80, west zone air handler 82, and south zone air handler 84. A main duct with branches extends from each air handler. In this type of system, each air handler is connected to the cold water loop and the hot water loop. In the exemplary prior art system, each air handler is independently operated to provide a desired temperature within its associated zone.

Such prior art systems do provide adequate heating and cooling, but they are not very efficient. As explained previously, the cold water loop must be maintained at a temperature that is low enough to meet the maximum cooling demand for any single air handler. This requires the provision of water at about 7 degrees centigrade (45 degrees Fahrenheit). Water this cold will rarely be needed, but it must be maintained to meet a local peak demand. The same problem exists for the hot water loop, where water at about 60-70 degrees centigrade must be provided even though a temperature this high may only be needed for one or two points in the entire building.

In the typical commercial building, the HVAC plant uses an average of 235 kW of power per 1,000 kWR of cooling. This produces a coefficient of performance ("COP") of 4.25. When the most advanced oil-free compression technology is used, the power consumption can drop as low as 109 kW per 1,000 kWR of cooling (COP of 9.1).

Most commercial HVAC systems are powered by electricity produced from fossil fuels. Carbon dioxide emissions are now a globally-recognized concern. Electricity generation is a major contributor to carbon dioxide emissions, with approximately 10,000 metric tons of carbon dioxide being emitted into the environment for every 1 MWh of electrical power generation. Commercial buildings account for a large portion of the electrical demand, and the biggest power consumer in most commercial buildings is air conditioning.

Air conditioning in most existing commercial buildings is provided by the chiller plant. Approximately 80% of all chillers presently sold are used to replace and upgrade existing equipment. The remaining 20% are used for new construction. Retrofit capability is thus an obvious goal for any new type of HVAC system. In the present invention, it is not generally necessary to replace the duct work and air handling units. These can generally be retained with reasonable modifications. The inventive system can replace most all of the existing commercial HVAC systems.

The present invention is thus applicable to both existing buildings and new construction. While the prior art systems produce a COP from 4.0 to 9.1, the present invention can produce a COP in excess of 14.0. Thus, the present invention saves a substantial amount of electricity while producing the same result.

BRIEF SUMMARY OF THE PRESENT INVENTION

The present invention comprises a heating, ventilation, and air conditioning system in which a primary water loop is used as a heat transfer reservoir for both heating and cooling. A plurality of micro chillers are provided, with each micro chiller being connected to the primary water loop. Each micro chiller includes its own heat engine. Each micro chiller includes one or more fan control units that exchange heat between the micro chiller and the air in a building. In a first mode a micro chiller transfers heat from the air in the building to the water circulating within the primary water loop. Ina second mode the micro chiller transfers heat from the water circulating in the primary water loop to the air in the building. A primary water loop regulation system is provided to control the temperature of the water circulating in the primary water loop.

An overall control system preferably controls all the components to act in an efficient manner. In many operational examples the net effect of the inventive system will be to transfer heat from one part of the building to another, rather than using external energy to heat or cool.

BRIEF DESCRIPTION OF THE SEVERAL VIEWS OF THE DRAWINGS

FIG. 23 is a plot of the coefficient of performance for several HVAC systems operating in the cooling mode.

FIG. 24 is a plot of the coefficient of performance for several HVAC systems operating in the heating mode.

Figure 1:
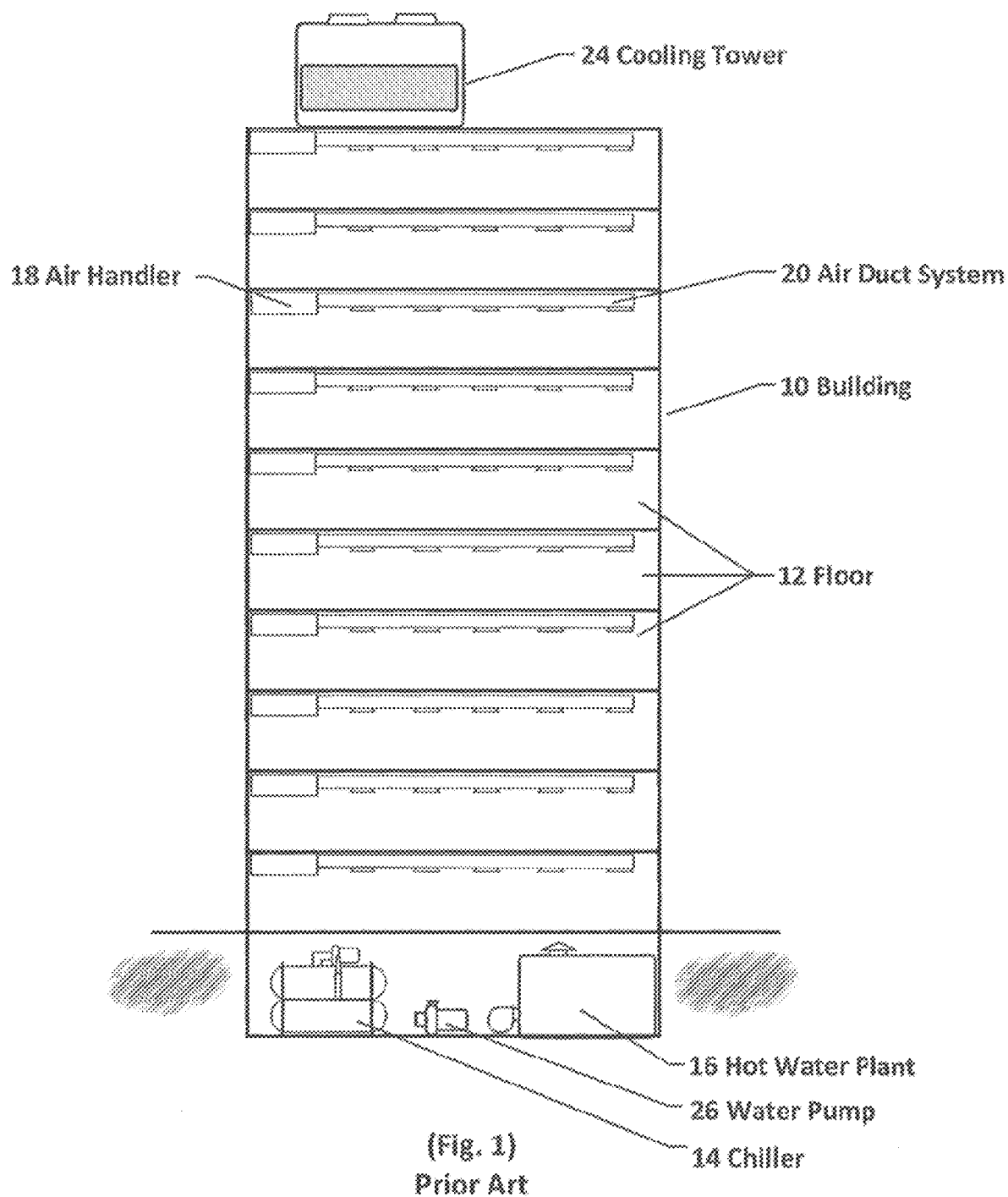
FIG. 1 is an elevation view, showing a prior art HVAC system in a multi-story building.
Figure 2:
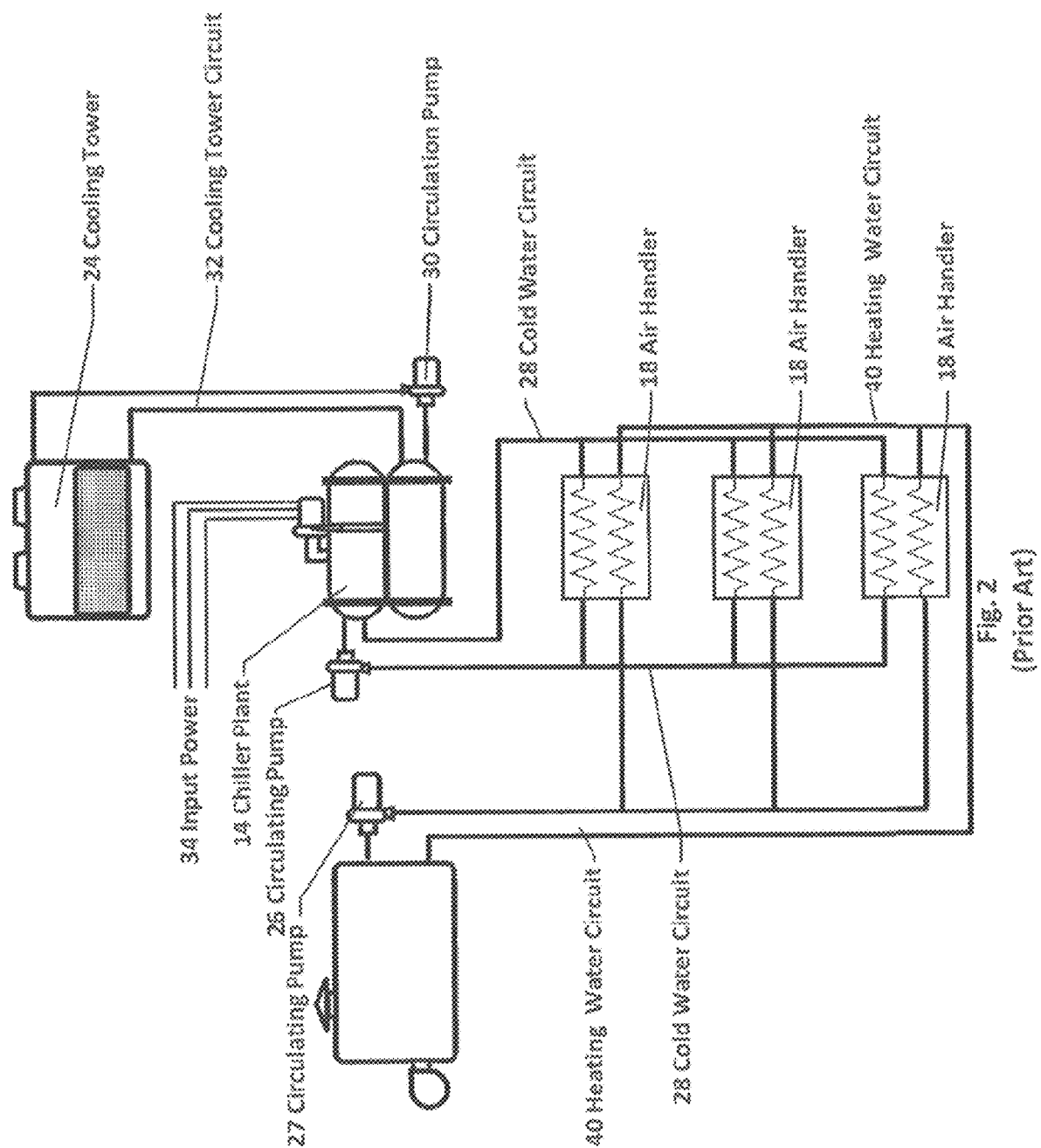
FIG. 2 is a schematic view, showing the use of a chiller and cold water circulation loop in a prior art HVAC system.
Figure 3:
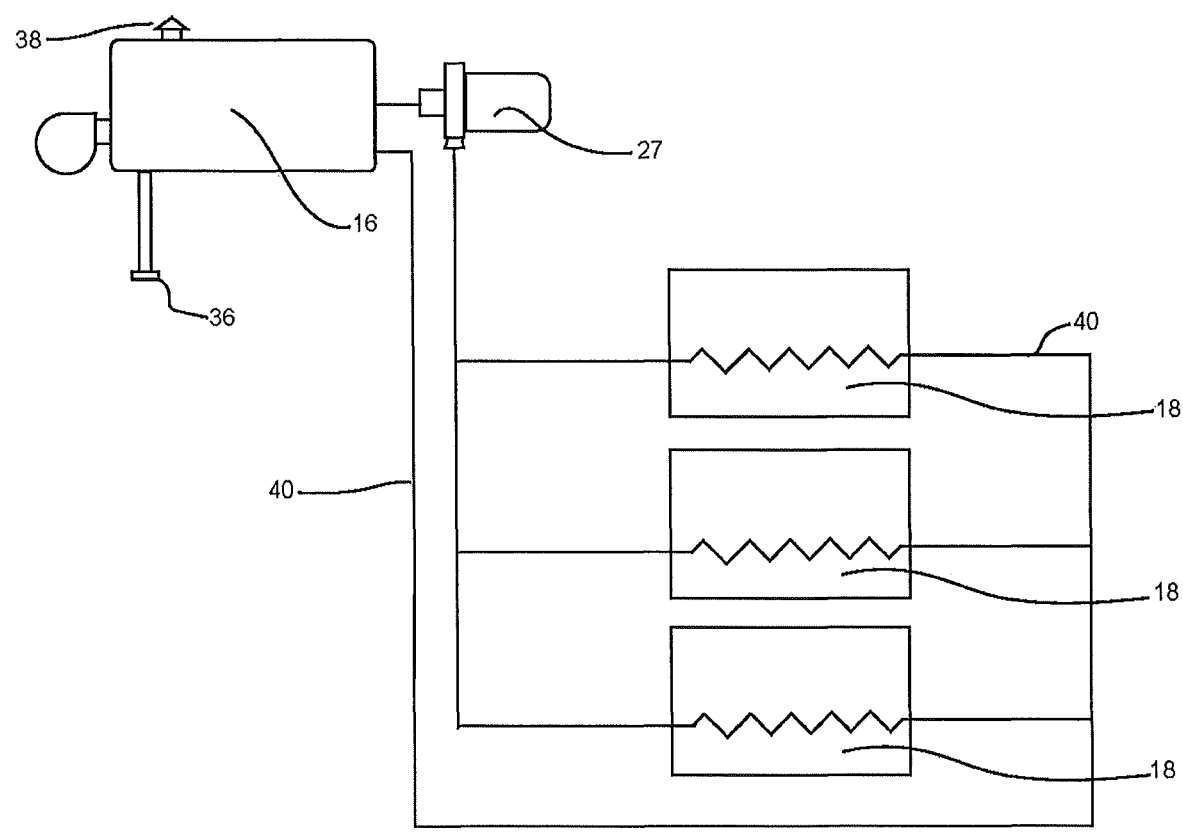
FIG. 3 is a schematic view, showing the use of a hot water plant and hot water circulation loop in a prior art HVAC system.
Figure 4:
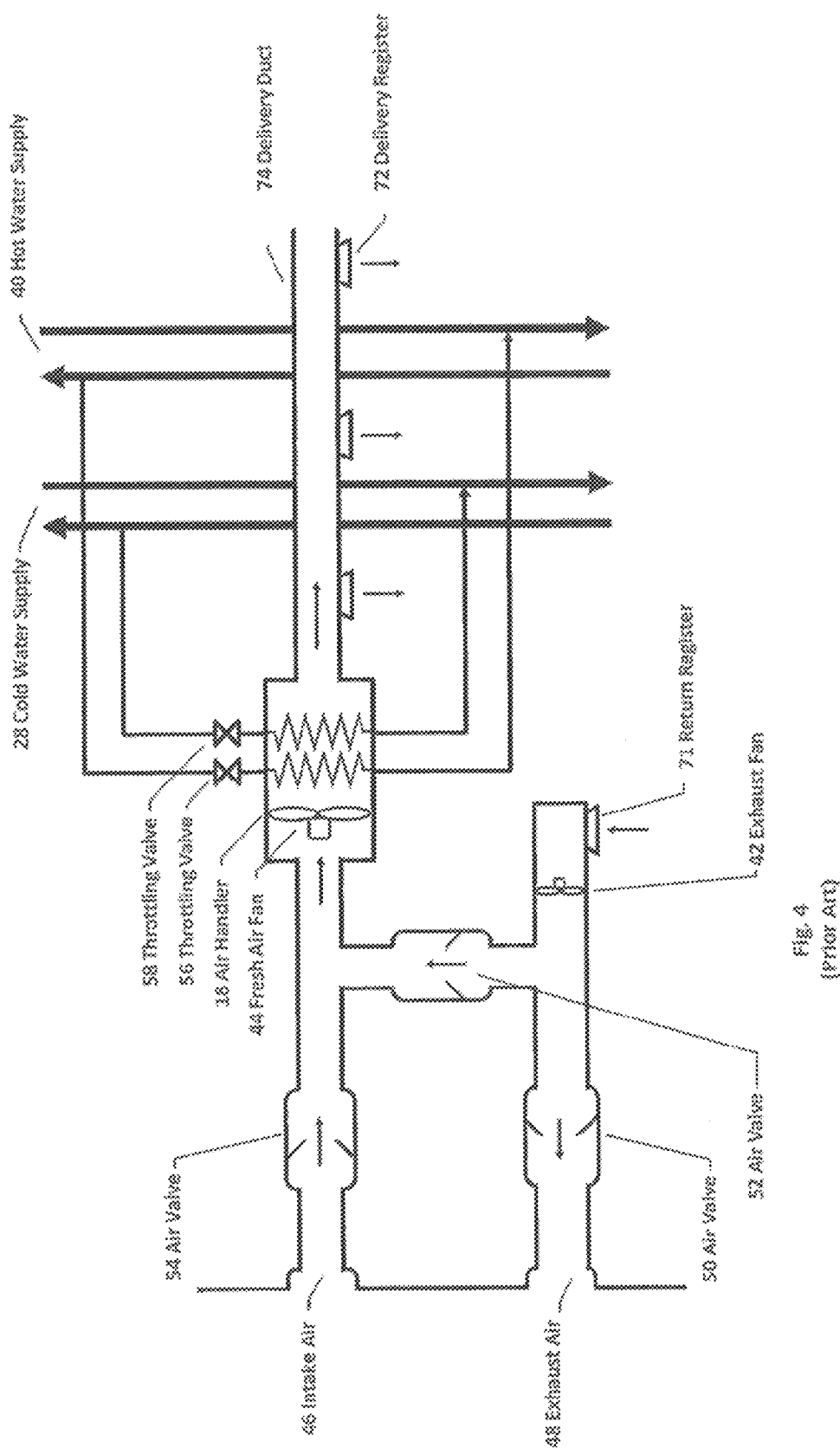
FIG. 4 is a schematic view, showing an air handler in a prior art HVAC system.
Figure 5:
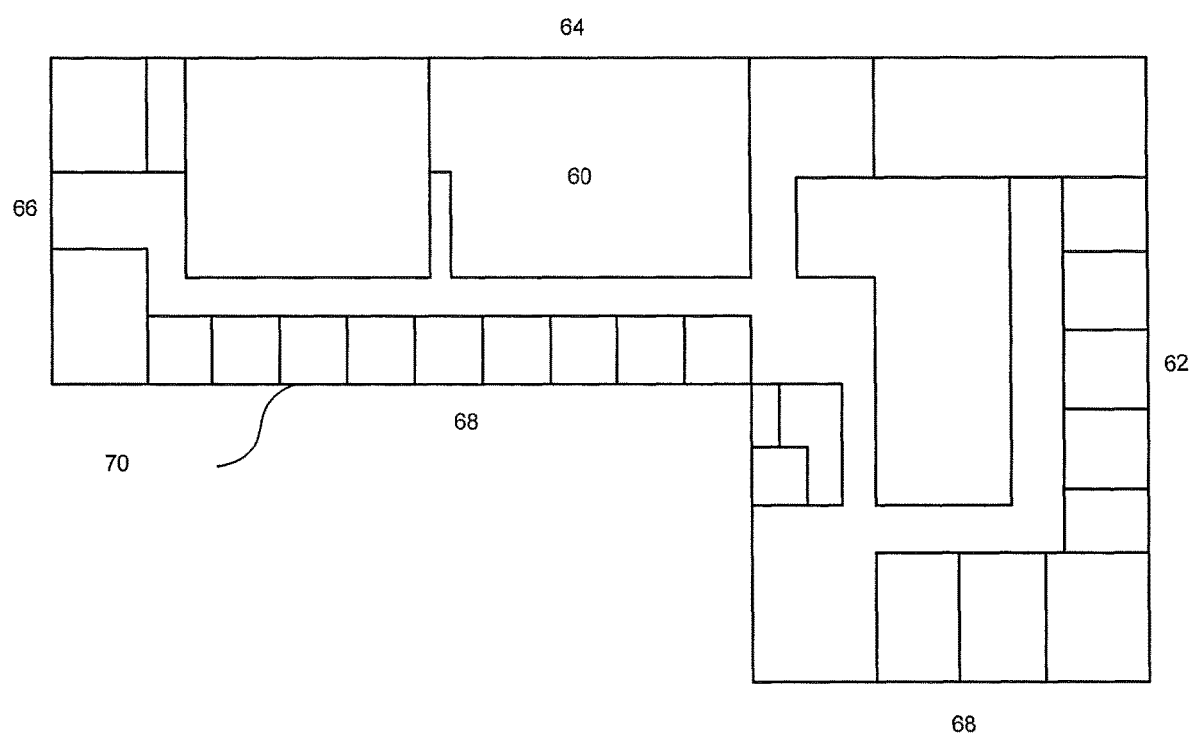
FIG. 5 is a plan view, showing zones on a single floor of a building.
Figure 6:
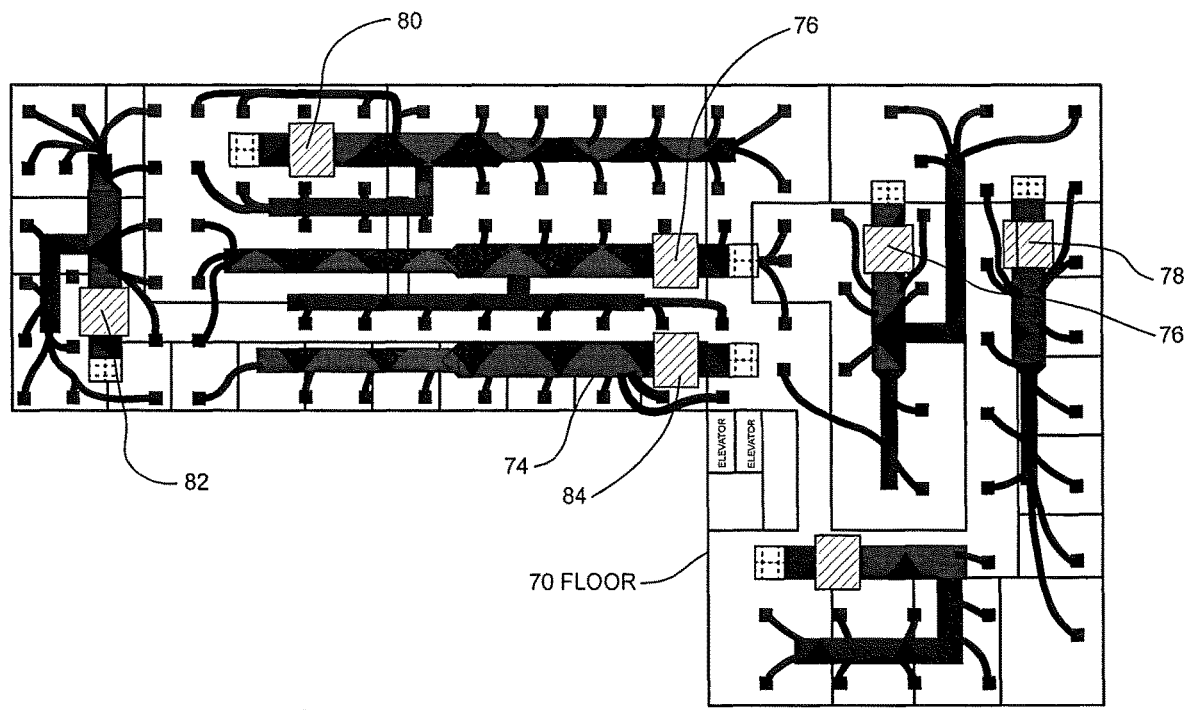
FIG. 6 is a plan view, showing the use of multiple air handlers and distribution ducts to cover the zones on a single floor of a building.

REFERENCE NUMERALS IN THE DRAWINGS 10 building
12 floor
14 chiller plant
16 hot water plant
18 air handler
20 air duct system
24 cooling tower
26 circulation pump
27 circulation pump
28 cold water loop
30 circulation pump
32 cooling tower circuit
34 input power
36 gas inlet
38 exhaust flue
40 hot water loop
42 recirculation fan
44 main fan
46 intake
48 exhaust
50 air valve
52 air valve
54 air valve
56 throttling valve
58 throttling valve
60 center zone
62 east zone
64 north zone
66 west zone
68 south zone
70 floor
72 delivery register
74 distribution duct
76 center zone air handler
78 east zone air handler
80 north zone air handler
82 west zone air handler
84 south zone air handler
86 primary water loop
88 primary water loop regulation system
89 circulation pump
90 micro chiller
92 fan control unit
94 return line
96 feed line
98 valve
100 valve
102 valve
104 valve
106 valve
108 valve
110 valve
112 valve
114 pump
116 pump
118 heat exchanger
120 heat exchanger
122 compressor
124 expansion valve
126 secondary water loop
128 chassis
130 reversing valve assembly
132 connection point
134 controller housing
136 fresh air duct
138 air control valve
140 recirculation air inlet
142 heat exchanger
144 intermediate water loop
146 first micro chiller
148 second micro chiller
150 third micro chiller
152 first secondary water loop
154 second secondary water loop
156 third secondary water loop
158 evaporative condenser
160 boiler
162 pump
168 heat pump
170 reversing valve
172 valve
174 valve
176 valve
178 valve
180 expansion valve 182 check valve
184 check valve
186 coil
188 refrigerant circulation loop
190 alternate micro chiller
192 heat exchanger
194 heat exchanger
196 heat exchanger
198 micro chiller curve
200 magnetic bearing curve
202 conventional cooling curve

DETAILED DESCRIPTION OF THE INVENTION

Figure 7:
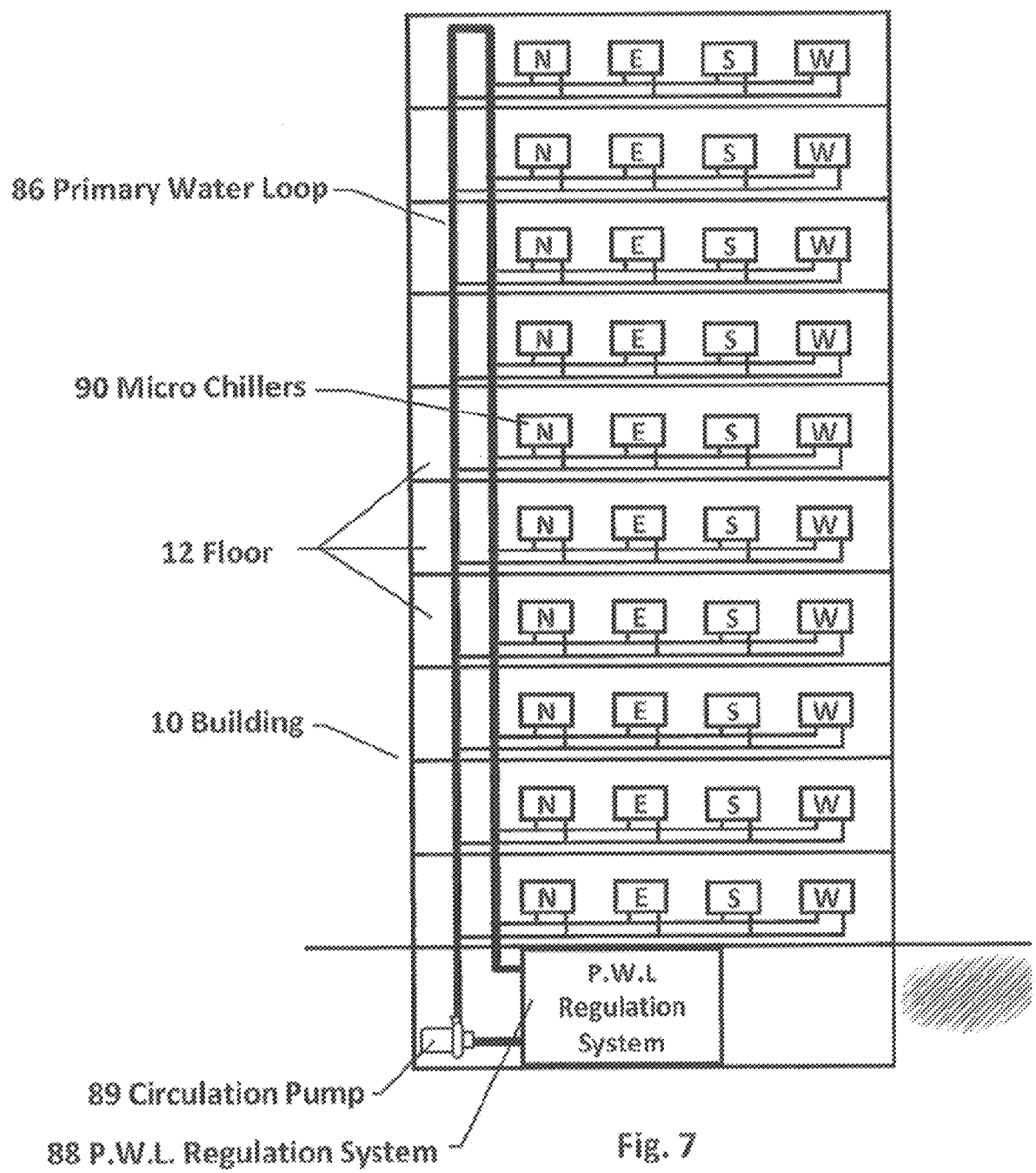
FIG. 7 is an elevation view, showing an HVAC system made according to the present invention.

FIG. 7 is a simplified schematic, showing how the inventive HVAC system can be installed in a multi-story building 10. Primary water loop ("PWL") 86 runs through the entire building. A circulation pump 89 maintains steady circulation, though the flow rate may be varied as needed. PWL regulation system 88 maintains the temperature of the water within the primary water loop at a desired point or within a desired range. Prior art HVAC equipment—such as a chiller and a boiler—can be used for PWL regulation system 88. Some examples are provided subsequently.

The invention uses circulating liquids to transfer heat. The circulating liquid is preferably water, with the term "water" encompassing solutions and mixtures in which anti-corrosion and other additives may be present as well. The circulating liquids may be something other than water, and this invention is not limited to the use of water. For convenience the term water will be used in the descriptions, though this term should be understood to encompass any suitable circulating liquid.

The water within the primary water loop will preferably be maintained within the range of 15 degrees centigrade to 30 degrees centigrade, more preferably between 18 degrees centigrade to 26 degrees centigrade, and most preferably between 20 degrees centigrade to 24 degrees centigrade (68 to 76 degrees Fahrenheit). This is a significant difference compared to the prior art HVAC systems, where water in the cold water loop is typically maintained below 7 degrees centigrade (below 45 degrees Fahrenheit) and water in the hot water loop is typically maintained above 50 degrees centigrade (above 122 degrees Fahrenheit). In the present invention, the water in the PWL is maintained in a range that is essentially the same as the desired air temperature within the building.

Figure 7B:
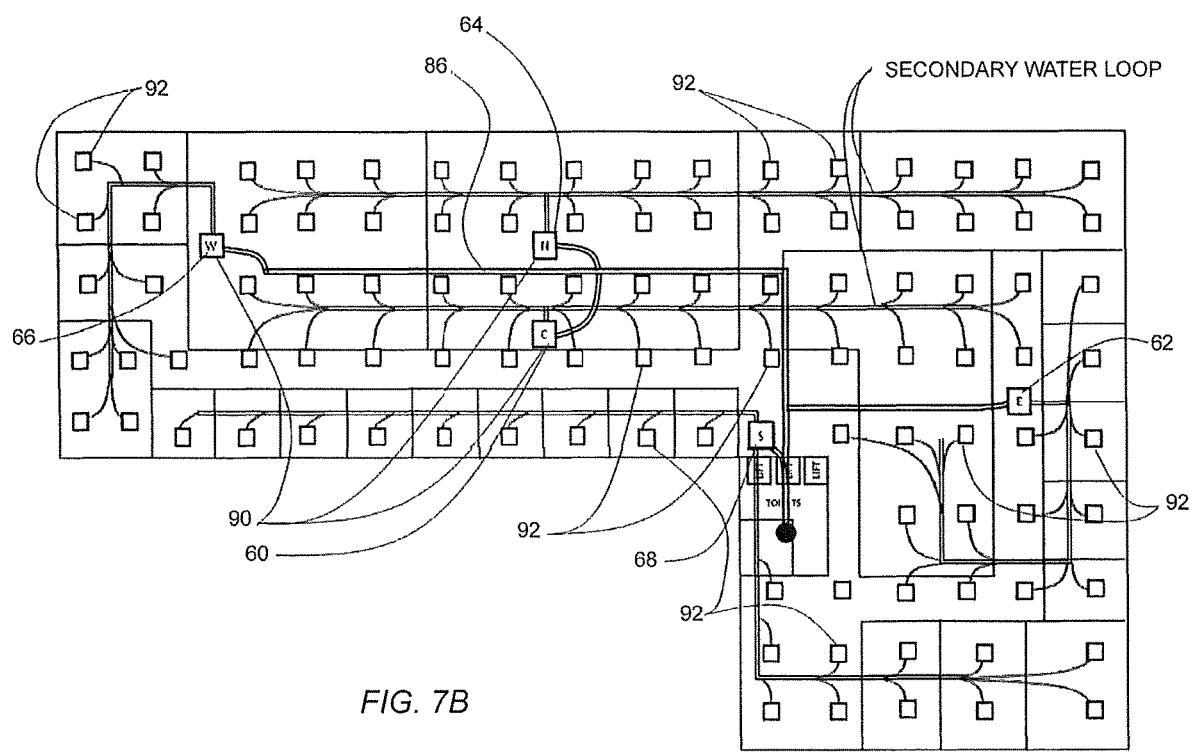
FIG. 7b is a plan view, showing an HVAC system made according to the present invention.

One or more micro chillers 90 are provided for each floor 12 of the building. Each micro chiller is configured to exchange heat with the water circulating in PWL 86. Each micro chiller is also configured to exchange heat with one or more associated fan control units 92 (shown in FIG. 7b). Each fan control unit or units heats or cools the air in the zone it covers.

In looking at FIG. 7, those skilled in the art will know that a primary water loop 86 spanning a significant height can create pressure problems, since the pressure near the bottom will become much greater than the pressure near the top. In tall buildings it will often be necessary to break the PWL into smaller subsidiary loops with water-to-water heat exchangers connecting the loops. Other approaches can be used to maintain the water pressure within a desired range. For example, pressure reducing and pressure adding devices can be placed within the loop. A pressure adding device is typically just a pump. A pressure reducing device can be an intermediate holding tank on the descending side of the loop.

The intermediate tank receives water from above and vents air pressure created in the tank to the atmosphere. Other pressure-regulating devices are known to those skilled in the art. The term "primary water loop" will be understood to possibly encompass these pressure-regulating devices.

Figure 8:
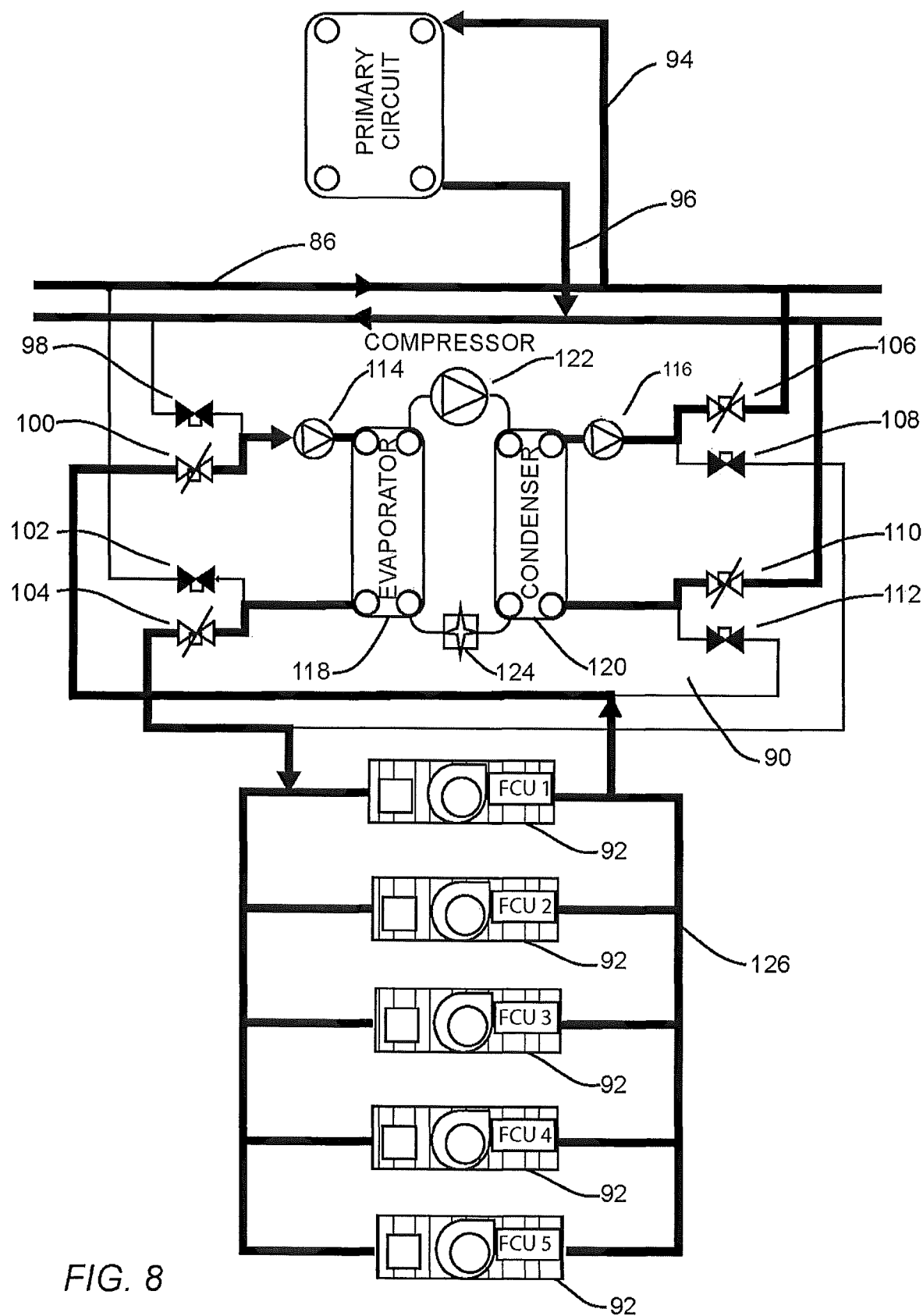
FIG. 8 is a schematic view, showing the use of a micro chiller feeding multiple fan control units.

FIG. 8 provides a schematic view of a single micro chiller 90 and its associated fan control units 92. Micro chiller 90 is connected to primary water loop 86. The tap into feed line 96 provides circulating water to micro chiller 90 and the tap into return line 94 returns water from the micro chiller to the PWL.

At the heart of the micro chiller in this example is a non-reversible heat engine. Compressor 122 compresses a suitable refrigerant and sends it to heat exchanger 120. Heat exchanger 120 acts as a condenser. It cools the circulating refrigerant and sends it to expansion valve 124. The expansion valve expands the liquid refrigerant and sends it to heat exchanger 118, which acts as an evaporator. The evaporator heats the gaseous refrigerant and sends it back to the intake side of compressor 122.

Heat exchanger 118 is cooled by the circulating refrigerant whenever compressor 122 is running. Thus, when the compressor is running, heat exchanger 120 is heated and heat exchanger 118 is cooled. Circulation pump 114 pumps water through heat exchanger 118 when it is activated. Likewise, circulation pump 116 pumps water through heat exchanger 120 when it is activated. The heat engine in this example is non-reversible, meaning that the flow through the refrigerant loop always travels in the same direction (as opposed to a heat pump which would include a reversing valve to reverse the flow through the evaporator and the condenser).

Secondary water loop 126 provides water circulation through one or more fan control units 92. Each fan control unit includes a coil for the water from the secondary water loop and a fan configured to blow air over the coil. If the water circulating through secondary water loop 126 is hot then the coil in the fan control unit is used to heat the air drawn through the fan control unit. If the water is cold then the fan in the fan control unit is used to cool the air. A distribution duct or ducts are typically connected to each fan control unit. These are not shown in the view.

A first set of control valves 98,100,102, 104 controls the flow of water through heat exchanger 118 (the evaporator). A second set of control valves 106,108,110,112 controls the flow of water through heat exchanger 120 (the condenser). Additional control valves may be provided on the various branches of secondary water loop 126 to control flow to each individual fan control unit 92.

Figure 9:
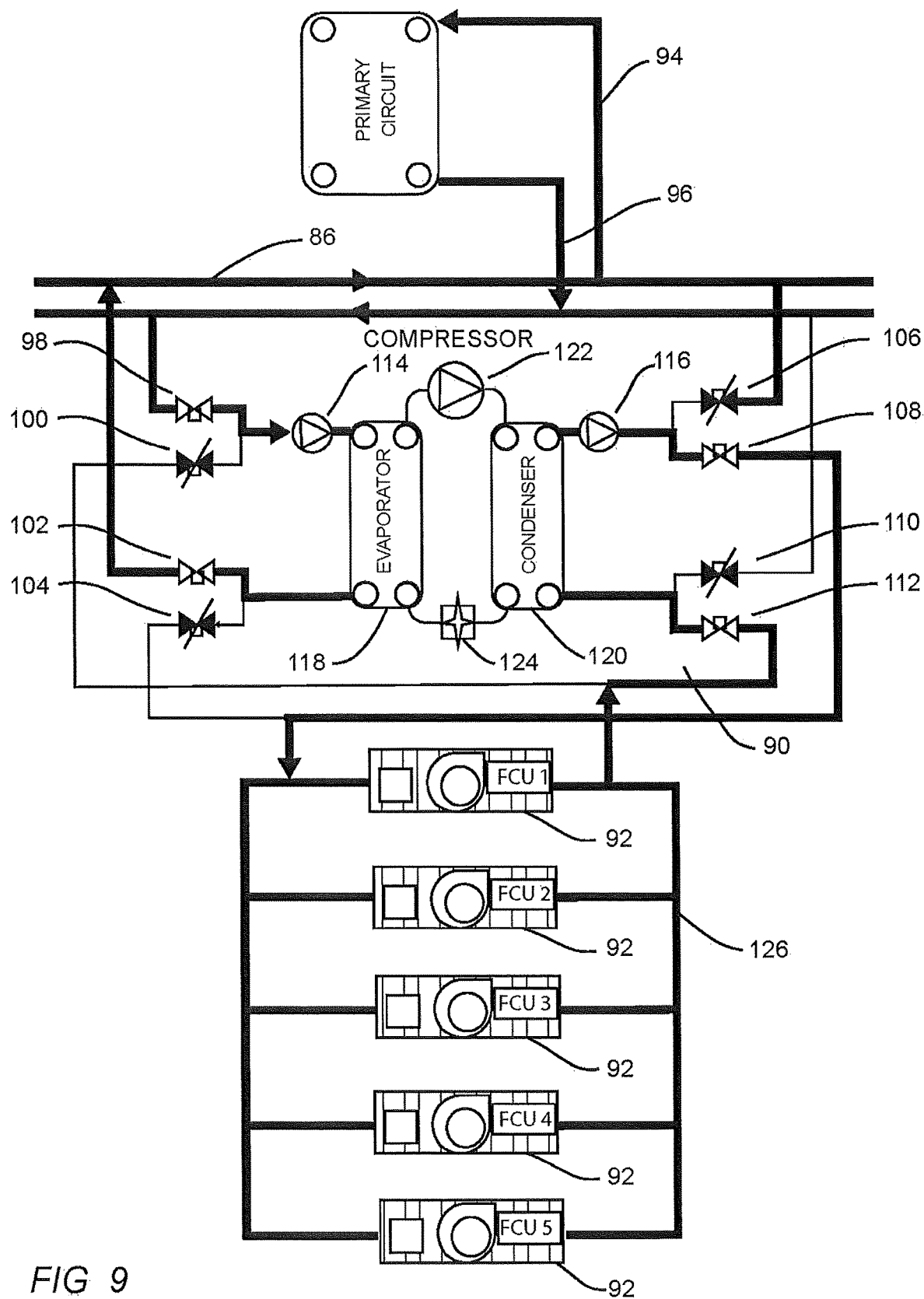
FIG. 9 is a schematic view, showing the operation of the device in FIG. 8 with the fan control units supplying heating.
Figure 10:
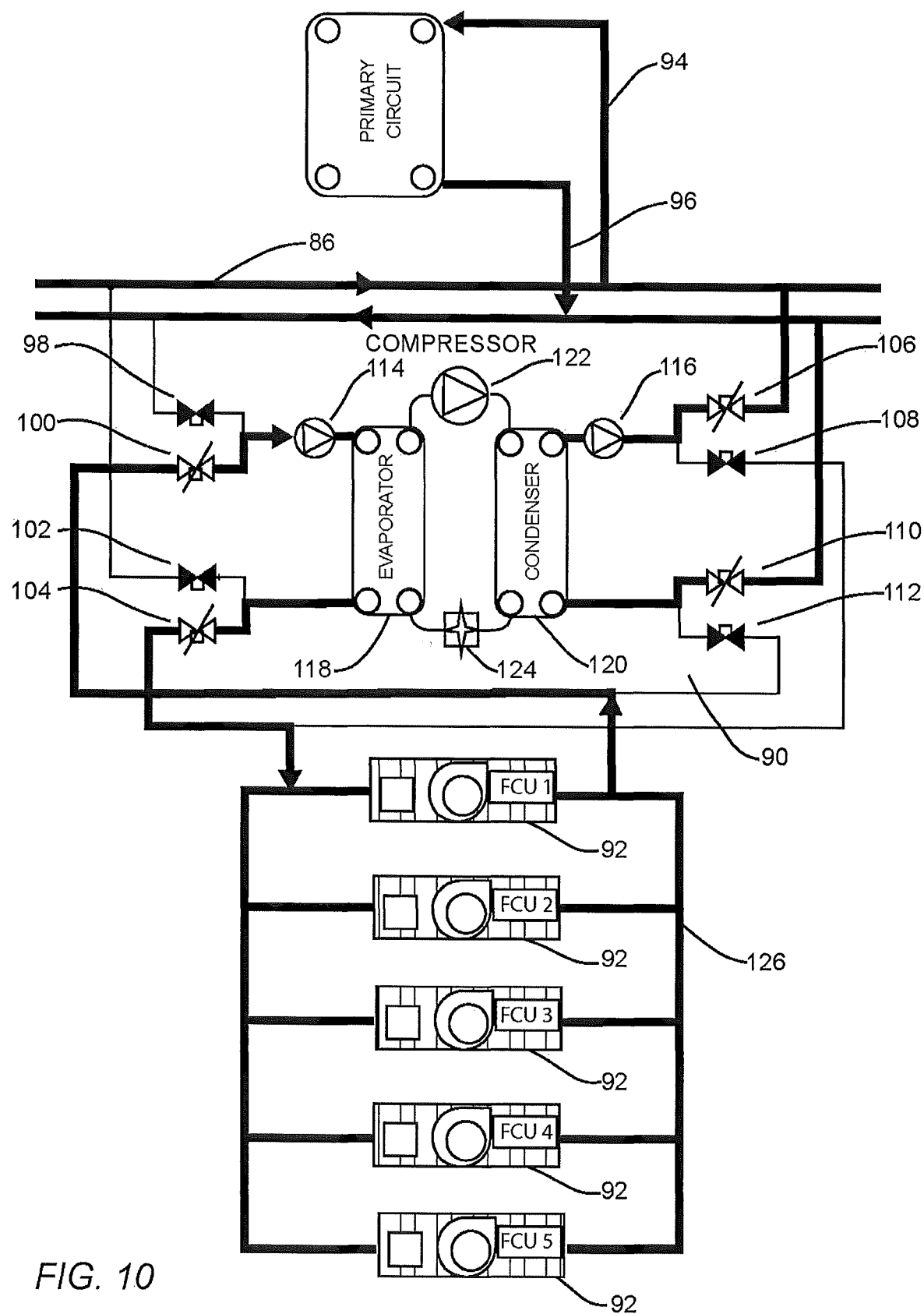
FIG. 10 is a schematic view, showing the operation of the device in FIG. 8 with the fan control units supplying cooling.

FIGS. 9 and 10 depict the micro chiller in its two primary modes of operation. FIG. 9 shows micro chiller 90 being operated in a heating mode where fan control units 92 are heating the air in their respective zones. Valves 98 and 102 are open. Valves 100 and 104 are closed. Water from the primary water loop comes in from feed line 96 and passes through pump 114. The water then circulates through heat exchanger 118 and back out through valve 102 before reaching return line 94. The flow path is shown in bold. The PWL water passing through heat exchanger 118 is cooled and returned to the PWL. Stated another way, heat is transferred from the water in the PWL to the micro chiller.

Valves 108 and 112 are open. Valves 106 and 110 are closed. Pump 116 pumps water from heat exchange 120 through valve 108 and out into secondary water loop 126. The water returning from the fan control units in the secondary water loop flows through valve 112 and into heat exchanger 120. The water passing through heat exchanger 120 is heated (recall that the heat exchanger is operating as a condenser for the refrigerant loop) and this heat is transferred to the fan control units. The heated water flowing through the fan control units is used to heat the air. In looking at the overall operation shown in FIG. 9, heat is taken from the water circulating in the primary water loop 86 and transferred to the air blowing through the fan control units 92. This is done by connecting the PWL 86 to heat exchanger 118 (the evaporator) and the secondary water loop 126 to heat exchanger 120 (the condenser).

FIG. 10 shows the same arrangement operating in cooling mode. Valves 106 and 110 are open. Valves 108 and 112 are closed. As in the prior example, water from the primary water loop comes in from feed line 96. However, unlike the prior example, the feed line water is directed through valve 110 to heat exchanger 120. Pump 116 pumps the water through heat exchanger 120 and through valve 106. From valve 106 the water passes back to return line 94 (where it reenters the PWL). The flow path is shown in bold. The PWL water passing through heat exchanger 120 is heated and returned to the PWL. Stated another way, heat is transferred from the micro chiller to the water in the PWL.

Valves 98,100,102,104 are set to circulate the water from secondary water loop 126 through heat exchanger 118 (the evaporator). Valves 100 and 104 are open. Valves 98 and 102 are closed. Pump 114 pumps water through heat exchanger 118 (the evaporator), and down into secondary water loop 126. The water returning from the fan control units in the secondary water loop passes through valve 100 and back to pump 114. The water running through the secondary water loop is thereby cooled and the cooled water is used to absorb heat from the building air passing through the fan control units.

In looking at the overall operation shown in FIG. 10, heat is taken from the air blowing through the fan control units 92 and transferred to the water circulating in the primary water loop 86. This is done by connecting the PWL 86 to heat exchanger 120 (the condenser) and the secondary water loop 126 to heat exchanger 118 (the evaporator).

The reader will note than at all times the refrigerant loop passing through heat exchanger 118 and heat exchanger 120 always flows in the same direction (pumped by the compressor). Unlike a residential heat pump, the refrigerant loop has no reversing valve. Heat exchanger 118 is always an evaporator and heat exchanger 120 is always a condenser.

Figure 11:
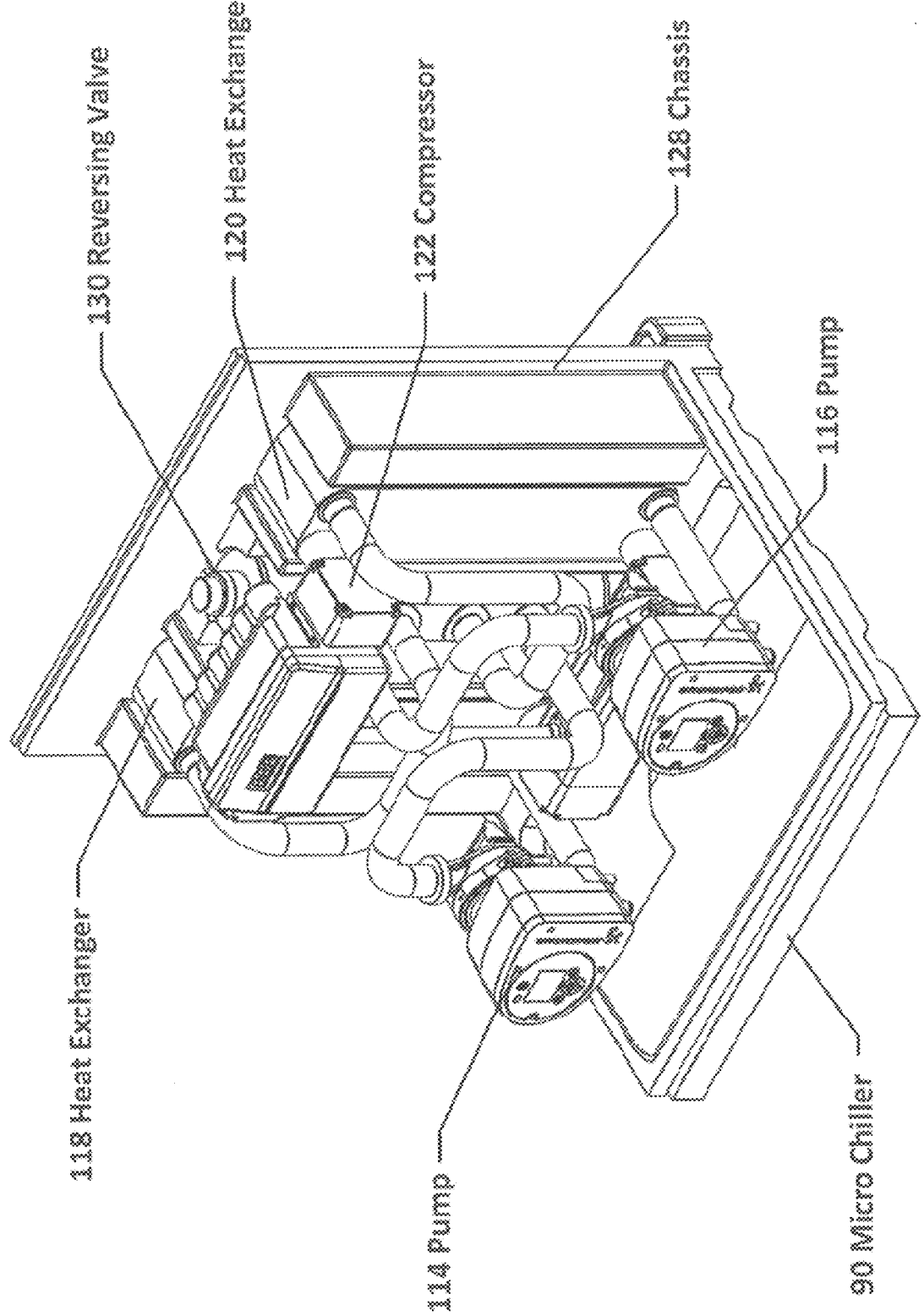
FIG. 11 is a perspective view, showing an exemplary physical embodiment of the inventive micro chiller.
Figure 12:
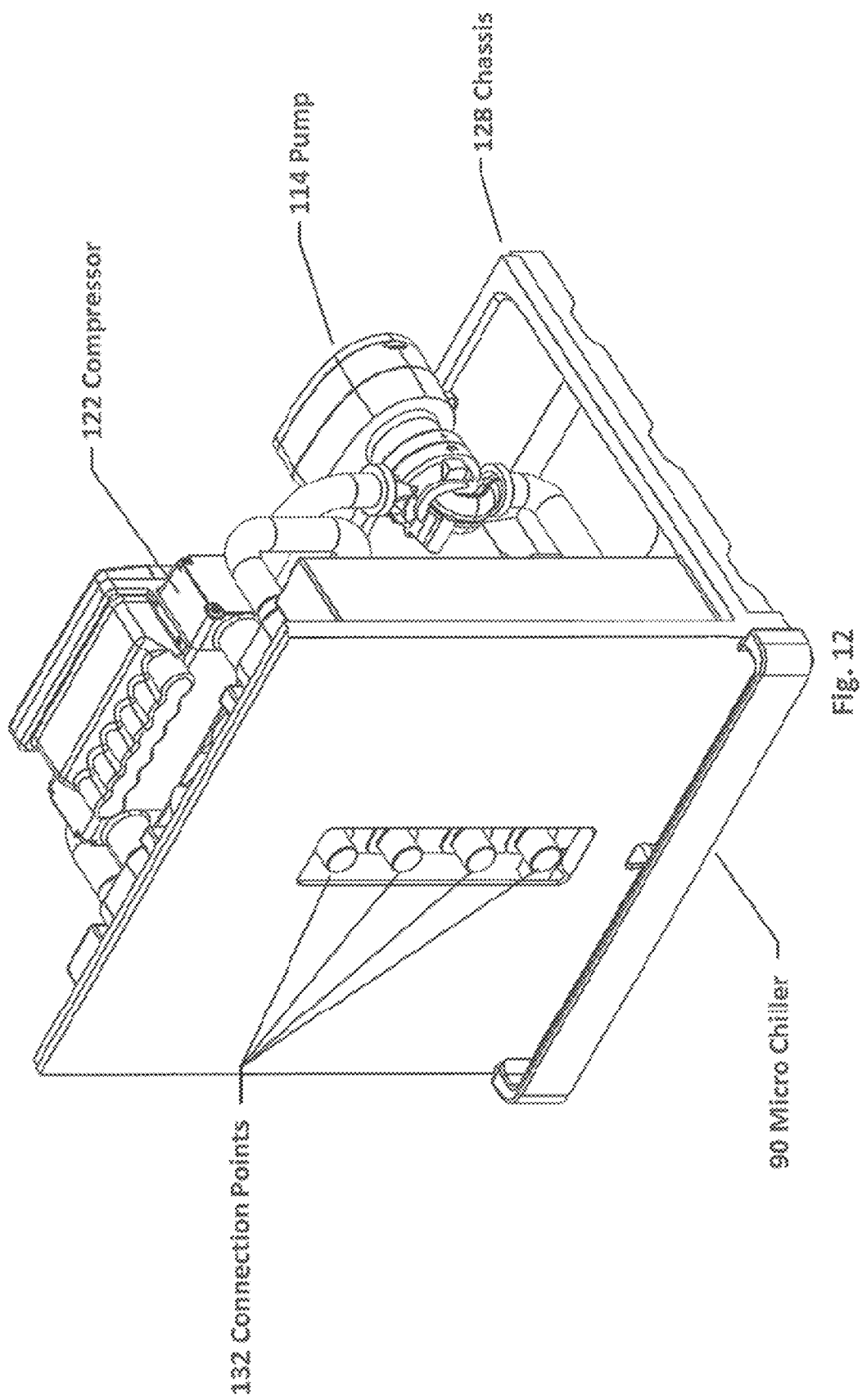
FIG. 12 is a perspective view, showing the embodiment of FIG. 11 from a different vantage point.
Figure 13:
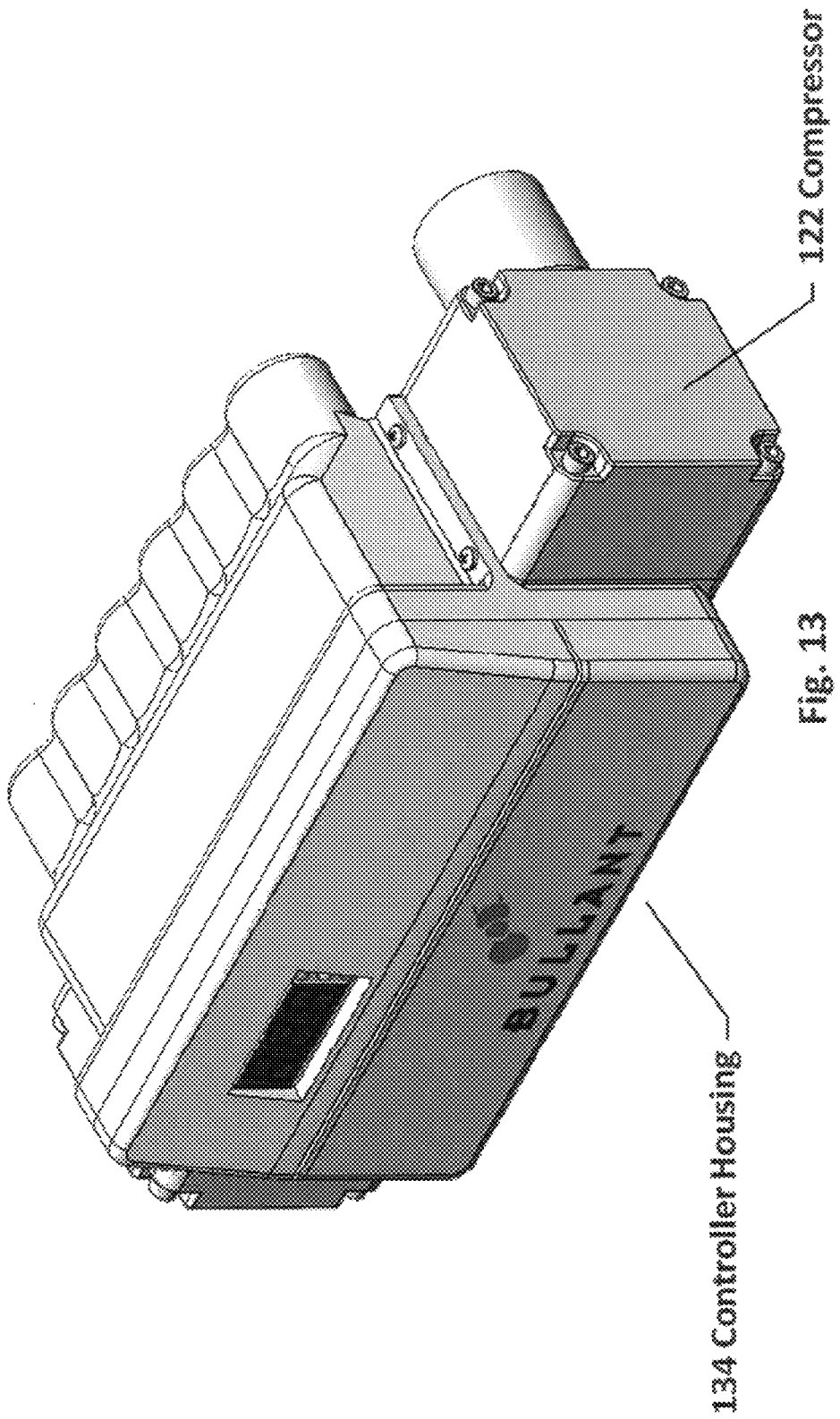
FIG. 13 is a perspective view, showing the compressor assembly and controller housing for the physical embodiment of FIGS. 11 and 12.

FIGS. 11-13 show some physical embodiments of the inventive micro chiller and its components. Micro chiller 90 in this example is contained within chassis 128. Heat exchangers 118 and heat exchanger 120 are mounted near one end of the chassis. Circulation pumps 114 and 116 are mounted near the opposite end. Compressor 122 is contained within the housing shown. Interconnecting pipes are provided to create a flow path according to the schematic of FIGS. 8 and 9.

FIG. 12 shows the same micro chiller from a different vantage point. In this view the reader will observe how the piping ends in four connection points 132. Two of these connection points lead to the primary water loop 86 and two of these connection points lead to the secondary water loop 126. As shown in the schematic views of FIGS. 8 and 9, four connection points are all that are needed to provide the required flow paths.

Returning now to FIG. 11, the reader will note that all the flow-controlling valves for the micro chiller are provided in this example in a single reversing valve assembly 130. The eight valves can be set to cycle with a single movable spool. The switching valves (valves 98, 100, 102, 104, 106, 108, 100, and 112 in FIGS. 9 and 10) are all contained within reversing valve assembly 130 (In order to avoid confusion the reader should bear in mind that the term "reversing valve assembly" in this case does not refer to a reversing valve within the refrigerant circulation loop). Reversing valve assembly 130 may be a spool valve where sliding a spool through a housing simultaneously operates more than one valve. As those skilled in the art will know, a single spool sliding through an appropriate housing can comprise all eight valves 98,100,102,104,106,108,110,112. In this way a single actuator within the valve assembly can provide the switching needed to operate the micro chiller in the heating mode or the cooling mode. An additional "idle mode" can also be provided, as will be explained.

Still looking at FIG. 11 the reader will note that compressor 122 is quite compact. The compressor is preferably a centrifugal model that operates at high speed. The compressor preferably uses ultra-low-friction bearing technology. This bearing technology allows the use of an oil-free refrigerant loop, which greatly increases efficiency. One approach is to use magnetic bearings which essentially "levitate" the compressor's rotating shaft. Such bearings are very effective, but also quite expensive. A cheaper approach is to use foil bearings. Foil bearings have a minimum "liftoff" speed that must be maintained in order to prevent any physical contact within the bearings. This liftoff speed is quite low—typically about 5% of the bearing's rated operational speed. Using such bearings allows a very high rotational speed for the compressor's rotating shaft. Such bearings also allow practically unlimited "unloading"—meaning that the compressor can be operated at a speed much lower than its rated maximum speed without risking contact in the bearings.

As a result of these factors compressor 122 is quite compact and light in comparison to its power output. FIG. 13 shows a physical embodiment of compressor 122 with an attached controller housing 134. The controller housing contains electronics that are configured to control the compressor's operation throughout its operating range, as well as the starting and stopping functions. In the preferred embodiments, the compressor will run continuously. During periods when no heating or cooling is needed, the controlling electronics will minimize the rotational speed (down to approximately 10,000 RPM). The controlling electronics will also cycle the micro chiller back and forth between the heating and cooling modes so that the water in the secondary water loop remains close to the air temperature in the space being managed by the micro chiller. This idle state does consume more power than simply turning the compressor off. However, by running the compressor continuously above the foil bearing's liftoff speed, compressor life is extended indefinitely. This operation is referred to as an "idle mode." The compressor is "unloaded"—meaning that its speed is reduced to a low speed that is high enough to preserve proper bearing function but where the rate of refrigerant circulation is greatly reduced. In this idle mode the eight valves are switched periodically so that the micro chiller cycles between a heating mode and a cooling mode (such as once every minute or once every five minutes, for example). This allows the compressor to continue running even when heating or cooling is not needed.

Figure 14:
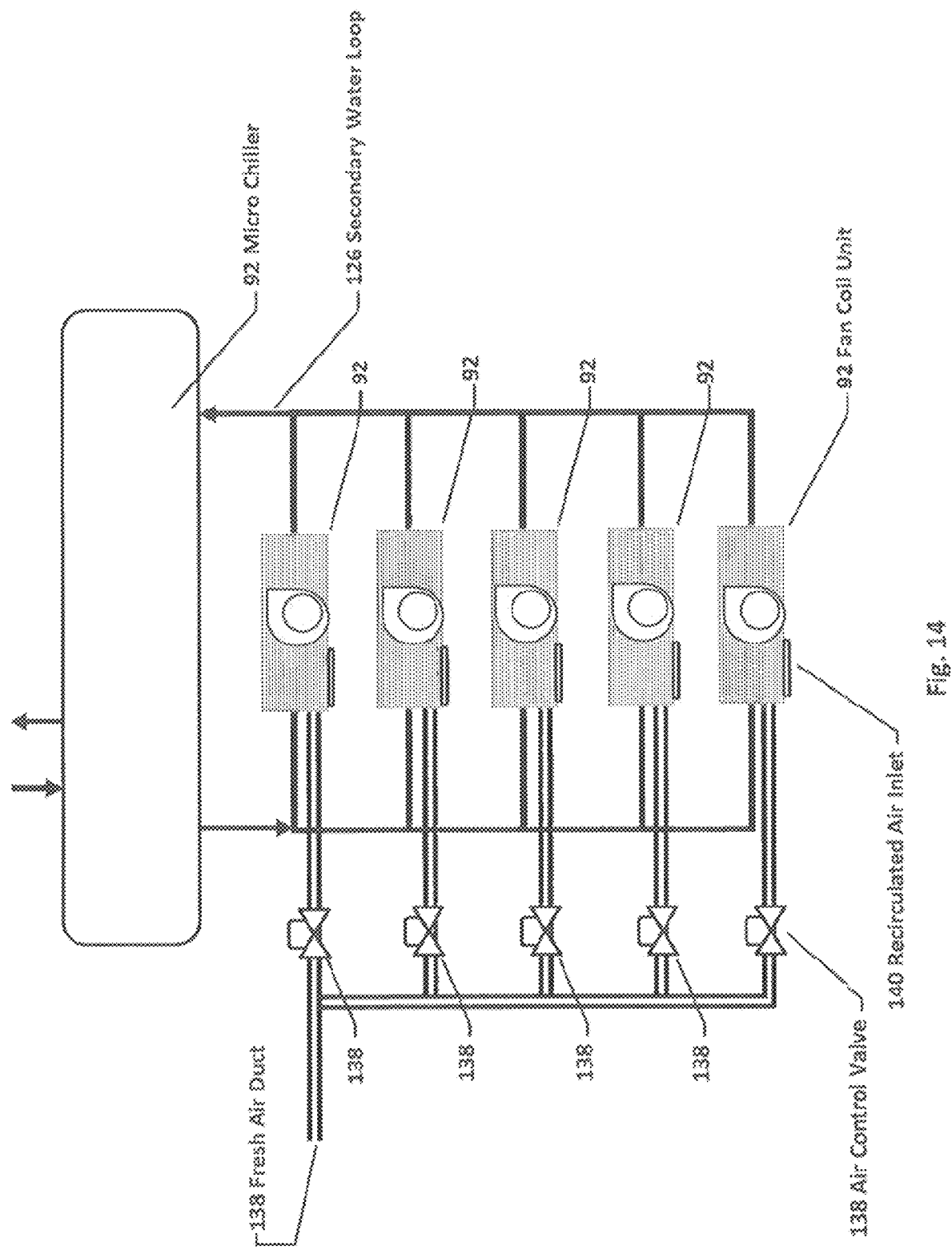
FIG. 14 is a schematic view, showing the provision of fresh air to the fan control units in an embodiment of the present invention.

Commercial buildings require the input of fresh air at specified levels. This is primarily done to minimize the accumulation of carbon dioxide. Some prior art systems monitor the carbon dioxide level and introduce fresh air as needed. However, most prior art systems simply admit a fixed volume of fresh air that is known via experimentation to keep the accumulation of carbon dioxide at an acceptable level. FIG. 14 depicts an embodiment of the present invention that takes a more sophisticated approach.

Fresh air duct 136 carries pressurized fresh air to fan control units 92. The fresh air admitted to each fan control unit is controlled by an air control valve 138. Recirculating air is provided to each fan control unit through a recirculating air inlet 140. The admission of fresh air often places additional loads on a building HVAC system. In hot and humid climates, additional energy is required to dehumidify and cool the incoming fresh air. It is therefore desirable to only admit the required volume of fresh air.

In the example shown a carbon dioxide sensor or sensors monitor the carbon dioxide level in each zone and the control system uses this information to modulate air control valve 138 so that the required amount of fresh air is introduced—but no more.

Figure 15:
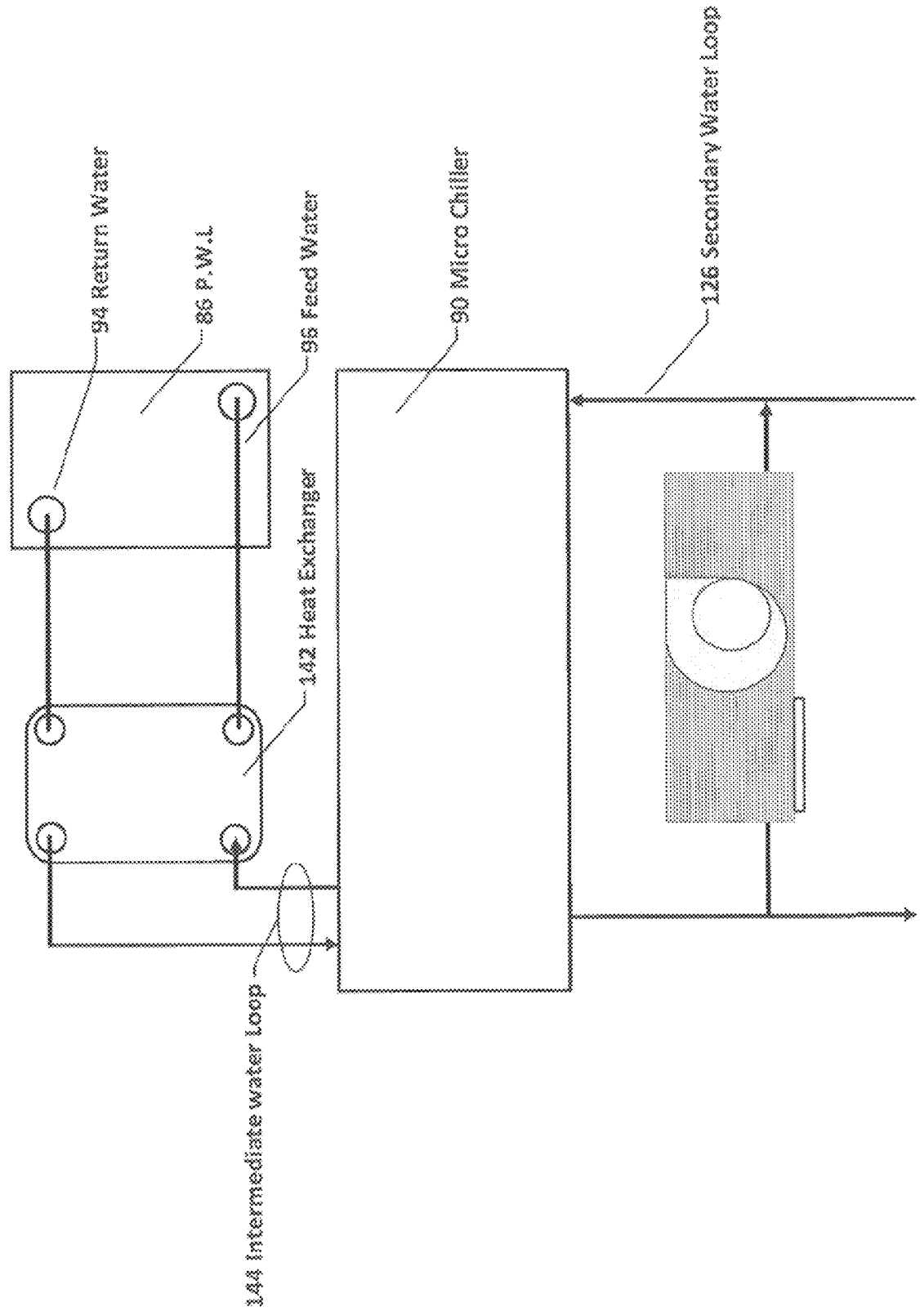
FIG. 15 is a schematic view, showing the use of a heat exchanger between a micro chiller and the primary water loop.

FIGS. 15-18 show additional exemplary embodiments. In the example of FIG. 15, primary water loop 86 is conveyed vertically via feed line 96 and return line 94. Heat exchanger 142 is provided for each floor. Heat exchanger 142 exchanges heat between the primary water loop and intermediate water loop 144. The intermediate loop provides circulating water (maintained in the range of 20 degrees centigrade to 24 degrees centigrade) to all micro chillers 90 on a single floor. Each micro chiller then pumps water through its own secondary water loop 126 out to the fan control units tied to the particular micro chiller.

Figure 16:
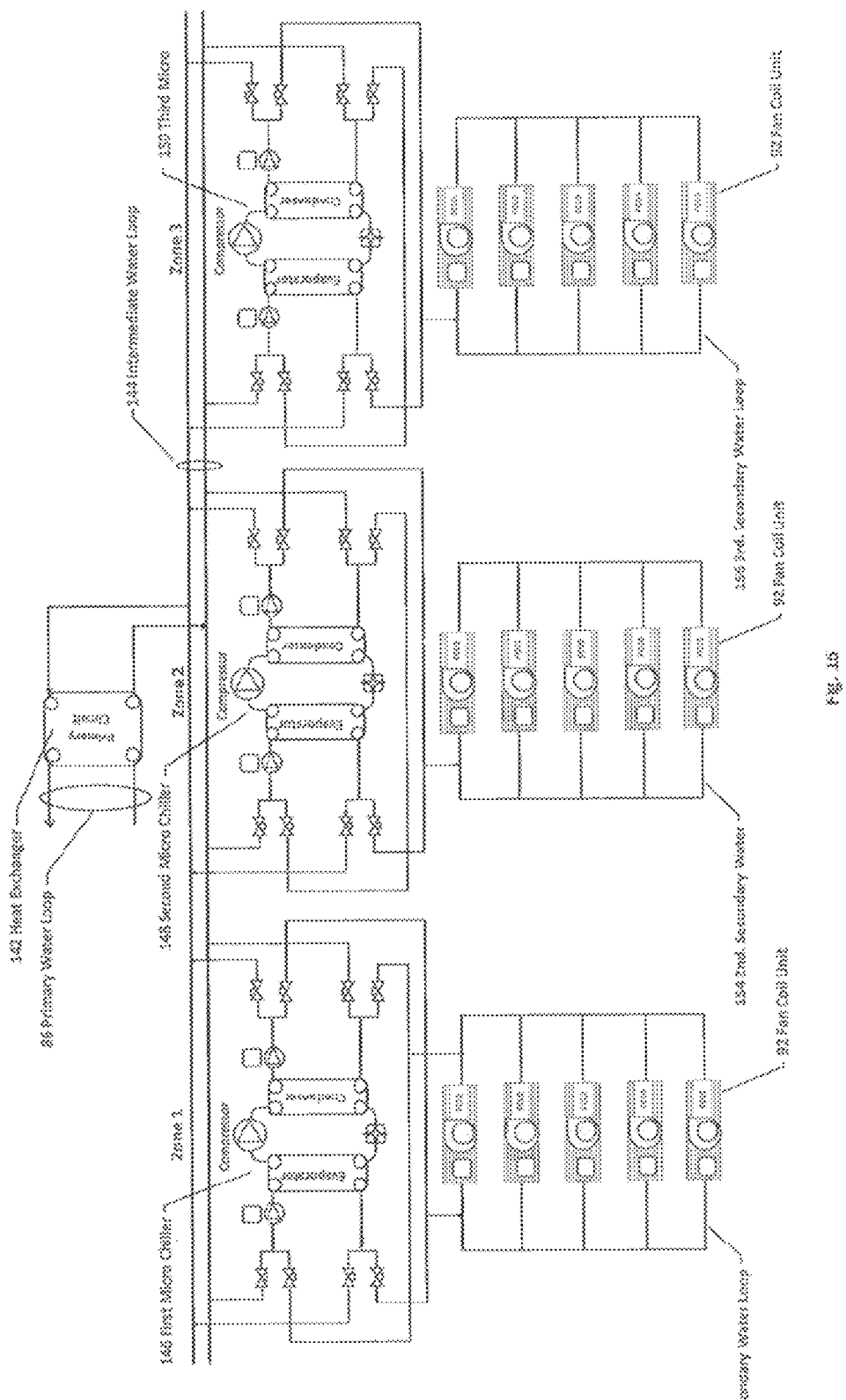
FIG. 16 is a schematic view, showing multiple micro chillers connected to a primary water loop via an intermediate water loop.

FIG. 16 shows a schematic for one entire floor. In this example heat exchanger 142 once again exchanges heat between primary water loop 86 and intermediate water loop 144. In this example all the micro chillers on a single floor are connected to the intermediate water loop 144. Three of these micro chillers are shown (micro chillers 146, 148. 150). Three secondary water loops 152,154,156 are also shown—one for each micro chiller.

All three micro chillers 146, 148, 150 are being operated in the same mode—the heating mode. However, this need not always be the case. At some times the micro chillers will be operated in different modes. An example is a cool morning with a high solar load on the floor's east zone. The micro chiller operating on the east zone will operate in the cooling mode while the other micro chillers on the floor operate in the heating mode. In effect, the east zone micro chiller will transfer heat from one part of the floor to another by transferring heat into intermediate water loop 144, with the heat being extracted again by the other micro chillers on the same floor.

Returning briefly to FIG. 7, the reader will recall that the temperature of the water circulating within primary water loop 86 is maintained by PWL regulation system 88. Sometimes this system will have to add heat to the circulating water and sometimes it will have to remove heat from the circulating water. As those skilled in the art will know, many known devices can be used to regulate the water temperature within the primary water loop.

Figure 17:
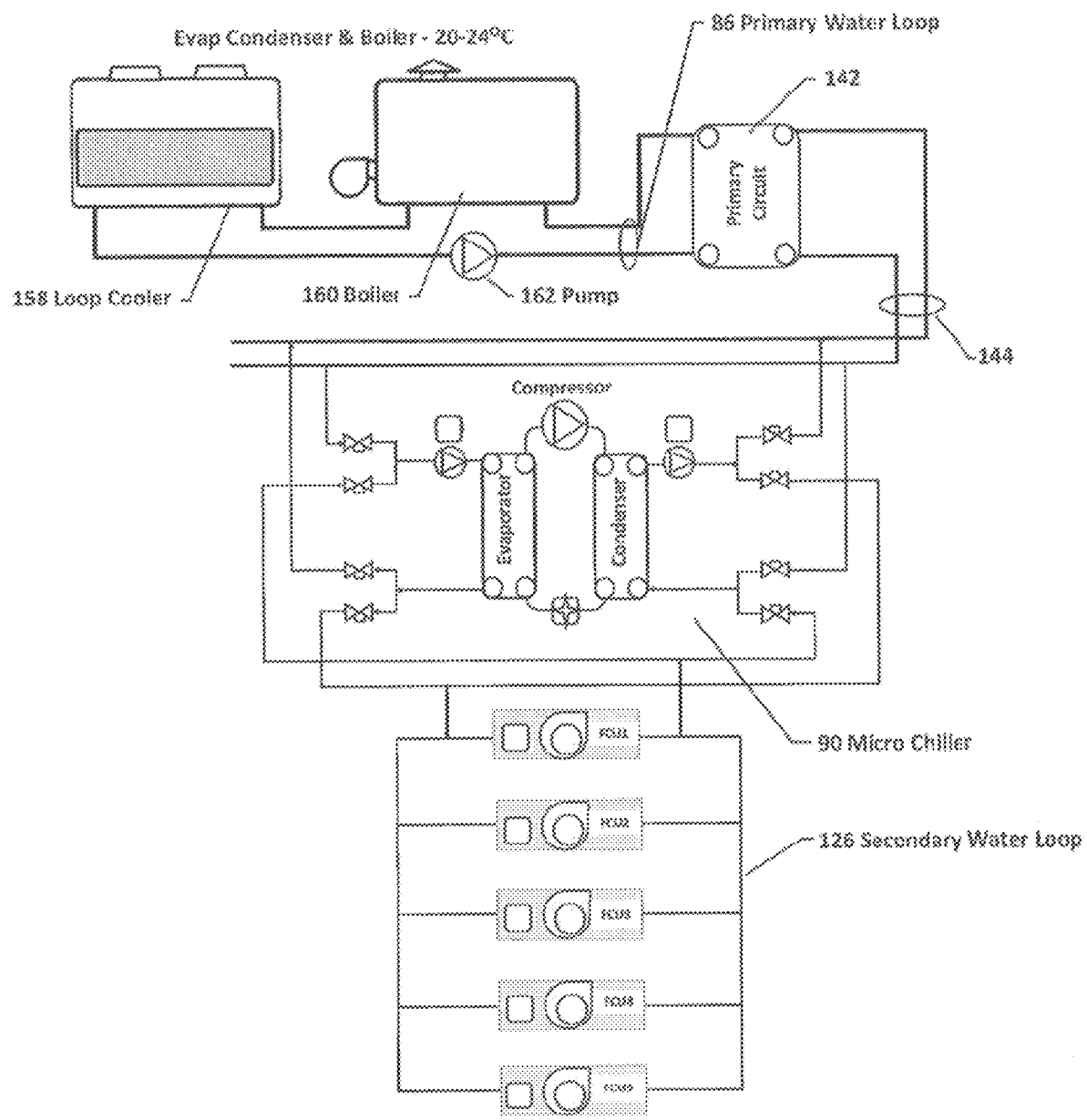
FIG. 17 is a schematic view, showing the use of an evaporative condenser and a boiler to regulate the primary water loop.

FIG. 17 shows an embodiment in which an evaporative condenser 158 and a boiler 160 are used to regulate the water temperature. During times when net cooling is required the evaporative condenser is operated to transfer heat to the air surrounding the building. During times when net heating is required, natural gas is burned within boiler 160 to raise the water temperature. Pump 162 circulates the water within primary water loop 86. A heat exchanger 142 transfers heat between primary water loop 86 and one intermediate water loop 144. Multiple micro chillers 90 are attached to intermediate water loop 144 in this example (only one micro chiller 90 is shown). Additional intermediate water loops (not shown) are also connected to the primary water loop 86.

Figure 18:
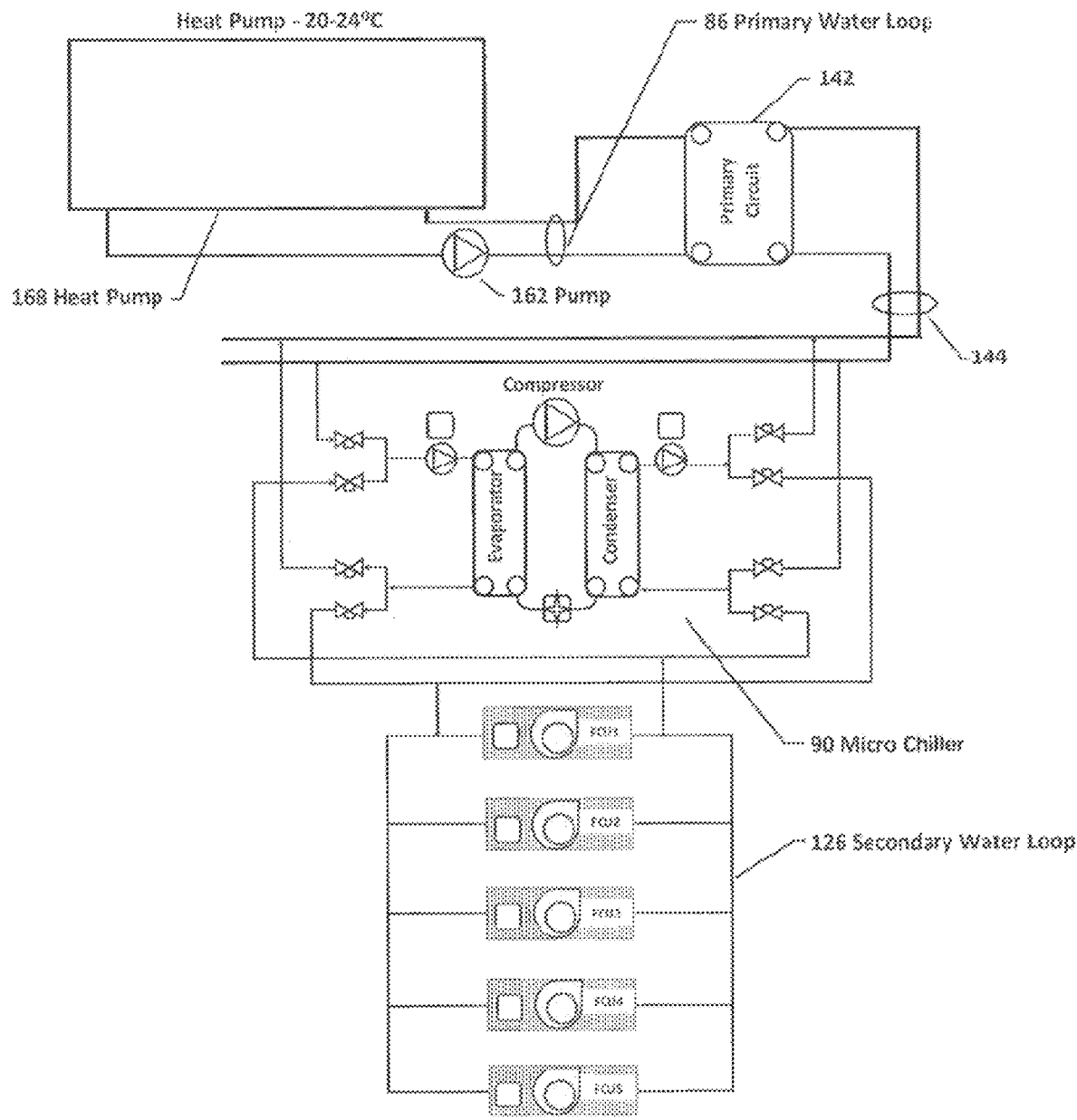
FIG. 18 is a schematic view, showing the use of a heat pump to regulate the primary water loop.

FIG. 18 shows a similar embodiment in which heat pump 168 has been substituted for the evaporative condenser and boiler in FIG. 17. A heat pump is typically used for smaller commercial buildings, but it is also possible to service a large commercial building by using multiple heat pumps in parallel.

Figure 19:
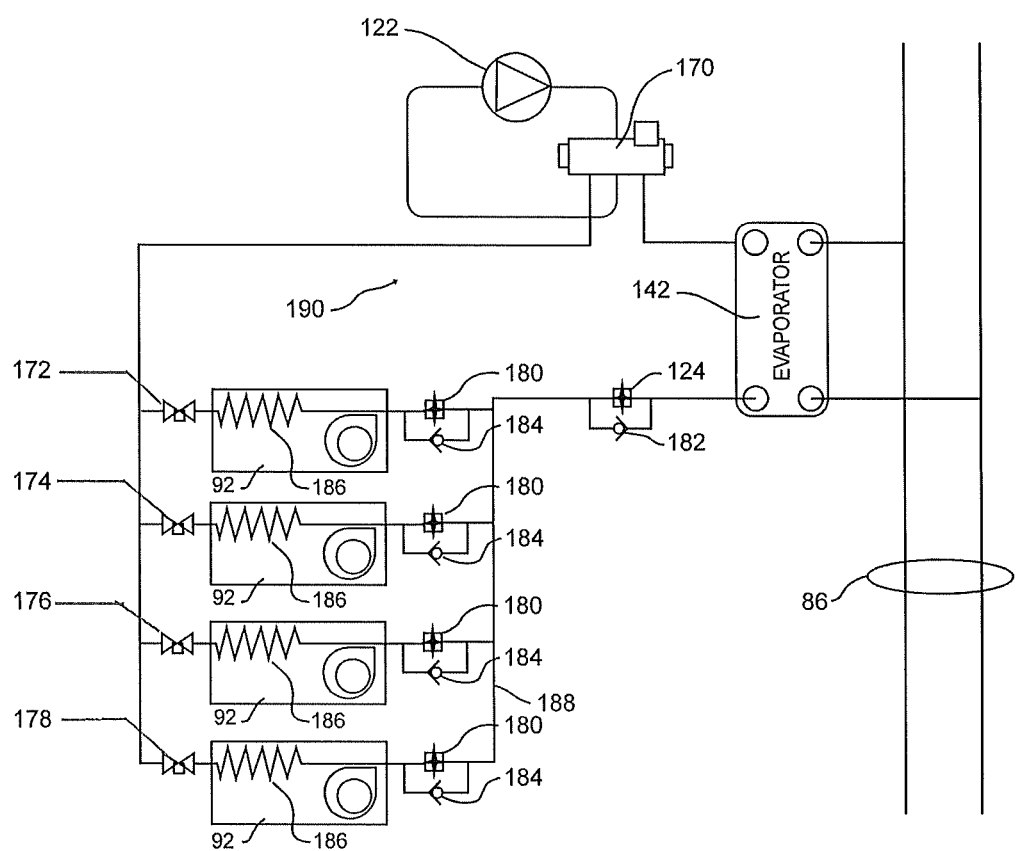
FIG. 19 is a schematic view, showing a micro chiller in which refrigerant is circulated in the secondary loop to the fan control units.
Figure 20:
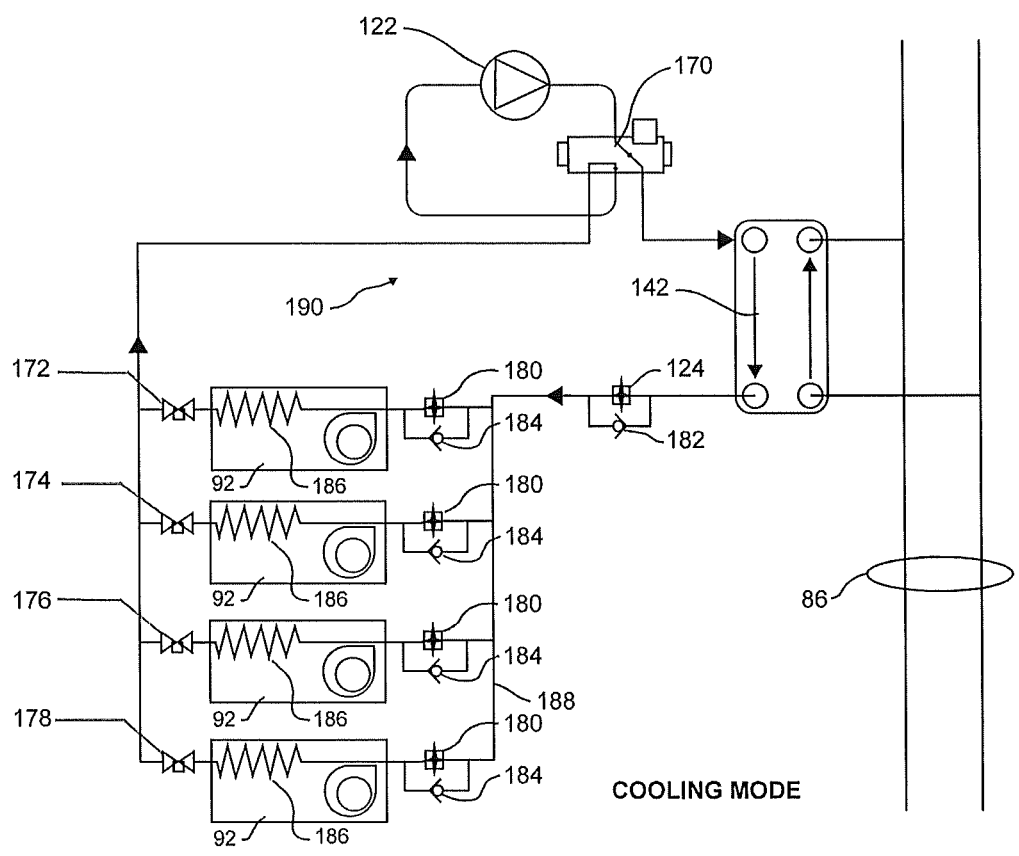
FIG. 20 is a schematic view, showing the embodiment of FIG. 19 with the fan control units supplying cooling.
Figure 21:
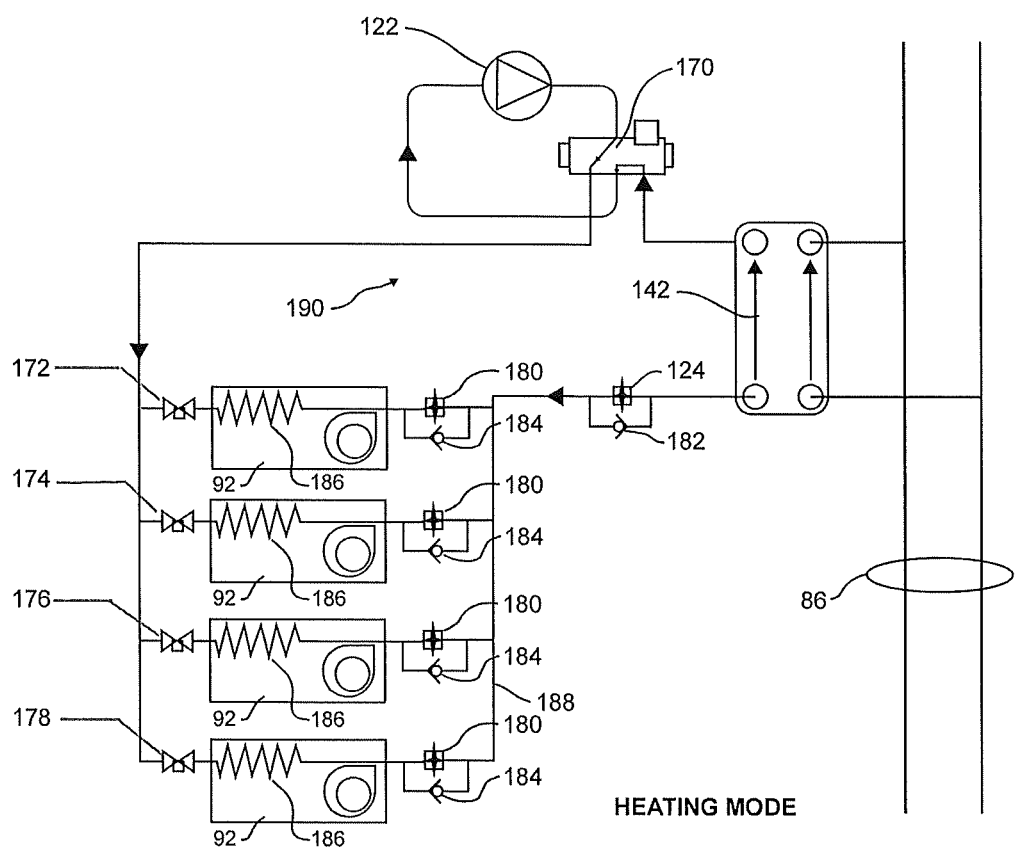
FIG. 21 is a schematic view, showing the embodiment of FIG. 19 with the fan control units supplying heating.
Figure 22:
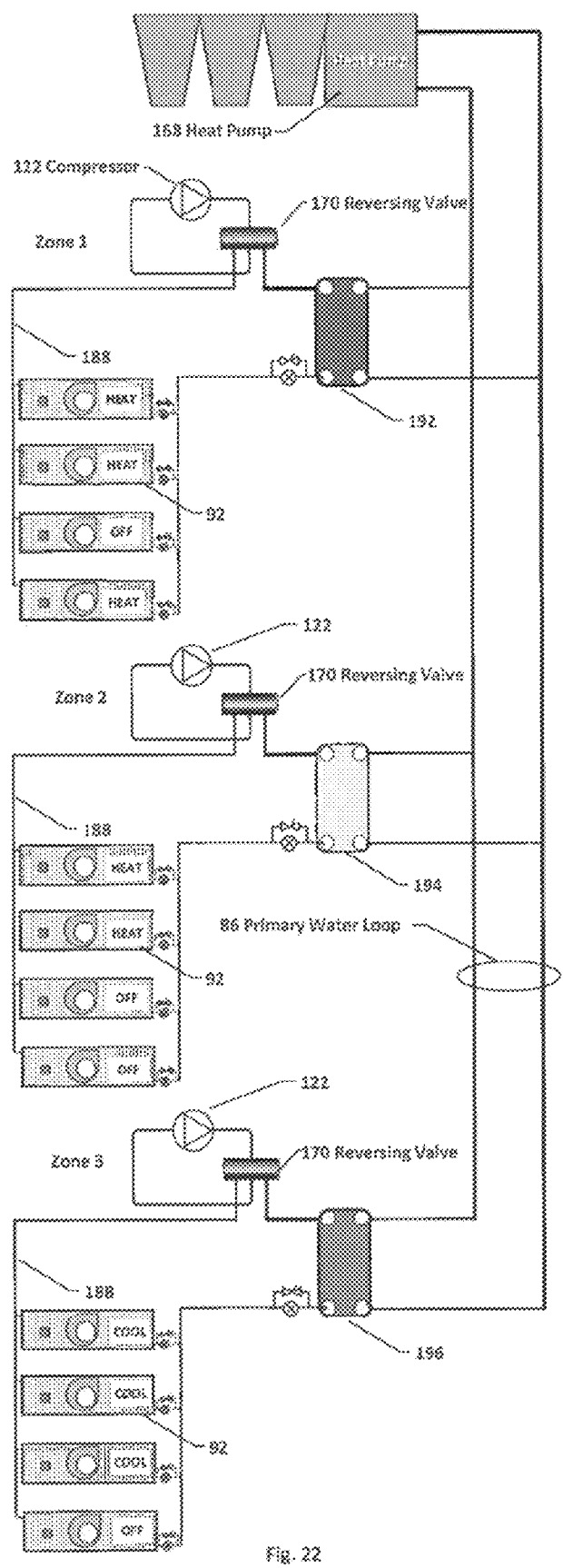
FIG. 22 is a schematic view, showing a configuration with multiple micro chiller units in which refrigerant is circulated in the secondary loop to the fan control units.

In the prior exemplary embodiments, a secondary water loop was used to transfer heat between a particular micro chiller and its associated fan control units. It is also possible to circulate refrigerant directly between a micro chiller and its associated fan control units. FIGS. 19-22 illustrate embodiments using this latter approach. FIG. 19 shows the components of alternate micro chiller 190, while FIGS. 20 and 21 show its operational states. FIG. 22 shows a system incorporating multiple micro chillers.

In the example of FIG. 19, compressor 122 pumps refrigerant to reversing valve 170. The reversing valve sends the pressurized (and hot) refrigerant gas either to heat exchanger 142 or fan control units 92—depending on the mode of operation. Heat exchanger 142 exchanges heat with primary water loop 86 (An intermediate water loop could also be used). As for the prior examples, heat exchanger 142 transfers heat to PWL 86 when the fan control units are operating in the cooling mode and receives heat from the PWL when the fan control units are operating in the heating mode.

Rather than using water circulating in a secondary loop to the fan control units, the embodiment of FIG. 19 sends the refrigerant itself to the fan control units via refrigerant circulation loop 188. The flow of the refrigerant is made reversible via the operation of reversing valve 170—as will be explained. Valves 172,174,176,178 individually control the flow to each fan control unit 92, so that a fan control unit can be switched off when heating or cooling is not needed in the area it covers. A coil 186 is provided in each fan control unit. This coil acts as either an evaporator or condenser, depending on the mode of operation.

An expansion valve 180 is provided for each fan control unit 92. Each expansion valve 180 includes a conventional bypass with a check valve 184. As will be familiar to those skilled in the art, the check valves 184 allow the refrigerant flow to bypass the expansion valves 180 when the fan control units are operated in the heating mode. Expansion valve 124 is provided for when the fan control units are operated in the heating mode. A bypass circuit with check valve 182 allows expansion valve 124 to be bypassed when the fan control units are operated in the cooling mode.

FIG. 20 shows the operation of alternate micro chiller 190 in the cooling mode. Reversing valve 170 is set in the cooling position. Compressed refrigerant gas leaves compressor 122 and is routed through heat exchanger 142. Heat exchanger 142 acts as a condenser for the refrigeration circuit. Cooled and condensed liquid refrigerant leaves heat exchanger 142 and passes around expansion valve 124 by passing through check valve 182. The liquid refrigerant then flows to the expansion valve 180 in each coil 186 and the expanded gas flows through the coils 186. (note that check valve 184 in each of the bypass circuits is closed by flow in this direction). Coils 186 are in this mode acting as evaporator coils. The fan in each fan control units blows air over the cold coil 186 and thereby cools the air.

The expanded refrigerant leaving the coils 186 is routed back through reversing valve 170 to the suction side of compressor 122. The reader should note that valves 172, 174,176,178 allow each fan control unit to be shut off if cooling is not needed in the zone controlled by a particular fan control unit.

FIG. 21 shows the same embodiment operating in the heating mode. The reader will note that reversing valve 170 has changed to its second position. Hot compressed refrigerant leaves compressor 122 and is routed through valves 172-178 to the coils 186 in the fan control units. The coils 86 in this mode of operation act as condenser coils. The fan in each fan control unit blows air over the heated coils and the air is heated. The refrigerant in the coils 186 is cooled and condensed. The cooled and condensed liquid refrigerant flows around expansion valves 180 through check valves 184. It is then expanded by expansion valve 124 (Note that check valve 182 is closed by flow in this direction). The expanded gas then flows into heat exchanger 142. In the heating mode, heat exchanger 142 acts as an evaporator coil, absorbing heat form the water circulating in the primary water loop 86. Once the heated refrigerant leaves heat exchanger 142 it is routed back through reversing valve 170 to the suction side of compressor 122.

FIG. 22 shows an expanded embodiment of the type shown in FIGS. 19-21. In this version the temperature of the water within primary water loop 86 is regulated by heat pump 168. Three separate micro chillers are connected to PWL 86. The upper micro chiller exchanges heat via heat exchanger 192. The middle micro chiller exchanges heat via heat exchanger 194. The lower micro chiller exchanges heat via heat exchanger 196. The reader will note that the mode of operation for each micro chiller is independent. The upper micro chiller is operating in the heating mode. Three of its associated fan control units are producing heat and one is shut off. The middle micro chiller is also operating in the heating mode. Two of its four fan control units are operating. The bottom micro chiller is operating in the cooling mode, with three of its four associated fan control units operating and one switched off.

FIG. 22 serves to illustrate one of the main operational advantages of the present invention. The reader will note that the upper micro chiller in the view is extracting heat from the water circulating in the primary water loop 86 and transferring that heat to the air passing through its associated fan control units. The middle micro chiller is also extracting heat from the water in the PWL—though at a lesser rate since it is only operating two of its four fan control units whereas the upper micro chiller is operating three of its four fan control units.

On the other hand, the lower micro chiller is adding heat to the water circulating in PWL 86. This is true because the lower micro chiller is using heat exchanger 196 as a condenser while running its refrigeration circuit to provide cooling to its fan control units. The reader will recall that the water within PWL 86 is circulated steadily. The result of this fact is that heat added to the PWL via the lower micro chiller is being extracted for use by the upper and middle micro chillers. Thus, the present invention transfers thermal energy around the building rather than adding external energy. Some micro chillers will be adding heat to the PWL while some will be extracting heat from the PWL. The same can be said for embodiments incorporating an intermediate water loop between the PWL and one or more micro chillers. Multiple micro chillers connected to a single intermediate loop can transfer thermal energy around the intermediate loop (such as transferring heat to a zone on the shady side of a floor from a zone on the sunny side of the same floor).

Of course, the transfer around the PWL or the PWL and the intermediate water loops will not be 100% efficient. It will also not always be possible to maintain the desired temperature throughout the building without adding some amount of external energy or subtracting an amount of excess energy. However, the inventive approach taken offers a significant efficiency increase over the prior art. The nature of this increase will be discussed in detail in the "OPERATIONAL ADVANTAGES" section. Before this discussion is reached, however, some additional component details will be provided.

Component Details—Compressor

The compressor used in the present invention preferably has an unlimited unloading capacity. In the context of HVAC, "unloading" means operating at something less than full capacity. The compressor can preferably vary its speed to match the required demand of the space it is servicing. Such a compressor does not have to turn on and off to match the load but will instead adjust its speed. The lower the load the lower the speed. As speed is reduced on the driving motor, electrical consumption drops at a cubic rate.

The compressor is also preferably an oil-free design. As mentioned previously, it may use magnetic bearings, foil bearings, air bearings, or some other oil-free technology. Prior art oil-based systems must be operated at a fairly high load in order to circulate the oil in the refrigeration loop and be certain that it does not collect away from where it is needed (the compressor). In an oil-free system, the compressor can slow down to as low as 5% of its rated speed. This feature means that the compressor never needs to be switched completely off but can instead run at a low idle. Compressor life is significantly extended via the use of low idle instead of a complete shutdown.

In some embodiments the compressor will be embedded within the heat exchangers. This arrangement eliminates external refrigeration pipe work—which always introduces a risk of leaks.

In the preferred embodiments, the centrifugal compressor uses an inverter to vary the compressor's speed. As with all inverters, some form of line reactor is desirable to improve the systems harmonics. These reactors are not 100% efficient, and they therefore generate heat. In the preferred embodiments, the line reactor is embedded within the refrigerant stream, so that the heat produced by the line reactor is rejected to the condensing circuit. When such a micro chiller is used in the heating mode, the heat generated by the line reactor is preferably fed into the heating circuit, thereby improving its efficiency. In a way of improving the efficiency even further, the reactor can be imbedded into an economizer circuit that is installed between the condenser and the evaporator, and the single expansion device would be exchanged for two expansion devices, so that the economizer operates at a temperature and pressure that is midway between the condensing pressure and the evaporating pressure, and the lost energy and the some of the latent heat in the condenser liquid is flashed off in the economizer and this gas is then fed back to the compressor. In this example the compressor has a first and second stage impeller, and the economizer gas is fed into the compressor between the two stages.

Component Details—Heat Exchangers and Expansion Valves

The heat exchangers can vary in style and technology, but in the preferred embodiments brazed plate heat exchangers are used. The condenser and evaporator used in the refrigerant loop are preferably able to be brazed as a common heat exchanger assembly. In some versions both the compressor and the expansion valve can be integrated inside of the heat exchanger assembly. Another approach is to have the heat exchangers physically separated and have the compressor either mounted as a separate unit or integrated into either the evaporator or the condenser. Similarly, the expansion device can be mounted separately, or fully integrated into one or both heat exchangers.

Component Details—Dehumidification

When the conditioned air requires dehumidification, the cold surface of the coil in the fan control unit (operated in cooling mode) is used to condense and remove moisture from the air. However, there are times when dehumidification is needed but the air must be reheated in order to maintain a comfortable air temperature. In such an instance the fan control units can be supplied with two coils. The first coil will circulate cold water from the secondary water loop. A second auxiliary coil will circulate heated water from the condenser. The cold coil will condense and remove excess humidity and the warm coil will then reheat the air.

Component Details—Fresh Air Supply

The preferred embodiments use an oil-free air blower to supply pressurized fresh air to the fan control units (FCU's) from a central fresh air blower system. Each FCU preferably has its own throttling device to control the level of fresh air each zone needs at any particular time. Instead of constantly supplying a set amount of fresh air, each FCU would preferably have its own carbon dioxide detector, and as the level of carbon dioxide is monitored, fresh air is only introduced into a particular zone when it is actually needed. Another option is to pre-dehumidify the air in the fresh air supply circuit, so that the dehumidification load is handled before the air is introduced into the building, which means that the FCU's do not need to be as large, and the FCU's will be able to control conditions with a warmer cooling water temperature.

Component Details—System Water Pumps

Each evaporator and condenser are fitted with its own set of chilled water and condenser water pumps, and as an option, each pump is fitted with a variable speed inverter allowing for higher energy efficiency in lower load conditions. Each pump is controlled by the micro chiller system. The water flow is adjusted so that the temperatures are correctly maintained through its whole cycle.

Component Details—Fan Control Units

Most commercial air conditioners use either Fan Coil Units/Fan Control Unit (FCU) or Air Handling Units (AHU) to cool or heat the air. Both of these units primarily do the same job, however the FCU usually handles a smaller space, while the AHU is usually a ducted system, and services a larger space. In this patent, the terms FCU and AHU, for all intentions, are interchangeable, and are meant to describe the device that is used to either heat or cool the air and to control the humidity level in a zone. For this reason, the term Fan Control Unit (FCU) has been used throughout the detailed descriptions.

Component Details—Primary Water Loop

As explained previously, the primary water loop (PWL) in the building is ideally kept between 20 and 24 degrees centigrade. Each micro chiller draws heat from the PWL or rejects heat to the PWL. The temperature of the water circulating in the PWL can be maintained using a variety of prior art HVAC systems. There are two main approaches. First, the water in the PWL can be run through a heat generator (such as a boiler) and then through an evaporative cooler of a cooling tower. Control valves are used to direct the water to the heating device or the cooling device as necessary. On hotter summer days, the PWL can be allowed to creep above 24 degrees centigrade.

The second main approach is to use a heat pump chiller to regulate the PWL temperature. If the water moves out of the 20-24 degree centigrade range, the heat pump chiller operates to heat or cool the loop as necessary. For many times of the year the PWL is simply transferring energy around the building and external thermal energy is not needed. For other times the heat pump or other device is operated to maintain the proper temperature.

In the case of an existing building, it may be possible to use the existing chilled water, or heating water circuit as the PWL. As an example, the existing water circuit could be converted so that the existing boiler and existing chiller are piped in series, or parallel. With the use of the inventive micro chillers, the prior art chiller could be adjusted to provide water at 20 degrees centigrade rather than the 7 degrees centigrade required in the prior art. Likewise, the boiler output temperature could be reduced to 22 degrees centigrade instead of the 50 degrees centigrade found in the prior art. This would greatly improve the efficiency of both the boiler and the chiller and add to the efficiency of the entire system.

Component Description—Micro Chiller Hardware Units

A physical embodiment of the micro chiller is shown in FIGS. 11 and 12. This unit is small enough to fit into existing equipment spaces on each floor and small enough to be transported via elevator. Thus, it will not be difficult to retrofit such a unit in an existing building.

The fan control units may be made in various sizes. A small version might replace an air register in one room. A larger version could cover an entire zone with the addition of air ducts. The water loop feeding the fan control units does not require large or heavy piping. It can be routed through the suspended ceilings found in most office buildings.

Component Description—Software-Based Control Units

The inventive embodiments are preferably controlled by a software based control system. In the preferred embodiments, a Predictive Preemptive Automation Control Algorithm (PPACA) is used as part of the overall control system. The PPACA is designed to control the energy balance within any particular zone, and the energy balance within the entire system. This means that the PPACA system is able to control the temperature, humidity, capacity, carbon dioxide level, fresh air, lighting, security, smoke detection and predict the cost of energy from the one device. This PPACA is important to the micro chillers' overall output, and adds flexibility to controlling conditions, efficiencies, and overall operation.

The PPACA is integrated into the micro chiller systems, and is used to control the micro chillers as well as the zones control. However, in some cases the PPACA will be supplied as a separate control unit, and in other cases will be integrated into central control system, or into a number of regional control systems which control a number of zones. For example, one PPACA may control a number of zones on a floor, or on a number of floors or all zones in the entire building.

For ease of installation, the control system may use an established communication protocol, such as Bluetooth, to communicate between the various devices being controlled, and may be remotely controlled by a cell phone or pad. It is also possible to configure the control system so that it may be remotely controlled and interrogated by a central control center, or other parties, such as a service technician who can be located anywhere, including off site.

A desirable property of the PPACA is the ability to predict the future spot pricing of electricity, and the ability to adjust the conditions in each space ahead of time so that the need for using energy during times when the cost of energy starts to spike is reduced. This is done by turning the building into a thermal storage battery. The PPACA records the moment by moment electrical spot prices and the weather pattern into the PPACA data base each day. It does this by accessing the spot pricing of power and the projected weather forecast (preferably using Internet-based resources). This allows the system to do its own prediction as to when the load in the zone is going to change, and predict when the cost of energy is going to increase and decrease. By making this prediction, it is able to either lower or raise the temperature in each zone ahead of time, when the cost of the energy is lower, and then reduce the demand on the system when the cost of power increases. During the times of higher energy costs, the load is deliberately lowered and the energy that is stored in the building (the colder air in summer, and the warmer air in winter) is used to bring the temperature closer to the desired set temperature. This utilizes the energy that is stored in the building and in effect turning the building into a thermal battery.

Operational Advantages

The main advantage of using the micro chiller approach is its ability to reduce the pressure ratio within the refrigeration circuit in the micro chiller itself. A refrigeration cycle has a "high side" and a "low side." The "high side" refers to the relatively high pressure existing from the output side of the compressor to the expansion valve. The "low side" refers to the relatively low pressure existing from the downstream side of the expansion valve to the suction side of the compressor. The term "pressure ratio" refers to the ratio between the high side and the low side.

When the inventive micro chiller is operating in the cooling mode, the condenser is kept between 20 and 24 degrees centigrade and the chilled water circulating in the secondary water loop (126 in FIG. 9) is operated between 7 and 24 degrees centigrade. This allows a pressure ratio within the micro chiller to vary between 1.05 and 1.4. The pressure ratio varies with the load.

When the inventive micro chiller is operating in the heating mode the condenser operates between 24 and 45 degrees centigrade and the evaporator operates between 15 and 20 degrees centigrade. This allows for a pressure ratio within the micro chiller's refrigeration cycle to vary between 1.1 and 2.9. Just like in the cooling mode, the pressure ratio varies with the load.

The pressure ratio used greatly affects the overall efficiency of an HVAC system. A conventional prior art chiller operates with a pressure ratio between 2.2 and 3.8. This higher pressure ratio reduces efficiency in comparison to the present invention.

Efficiency in an HVAC system is largely driven by the difference between the desired air temperature and the temperature of the heat "sink" source. A large difference demands a highly loaded HVAC system and a consequent reduction in efficiency. A prior art chiller-based system typically has a large temperature difference and hence a low efficiency.

In many cities around the world, the climate is temperate through most of the year. Although summer and winter seasons are present, much of the year is spent in temperate weather. In temperature weather the temperatures vary throughout the day, and in many cases, the buildings need cooling and heating to operate simultaneously. They can have periods of the day where the sun is shining on an east wall of a building on a cool morning, and that side of the building needs cooling. However the other parts of the building that are not exposed to the sun may still need heating. In this case, the chillers need to be operating as do the hot water boilers and, in these cases, the plant often supplies both hot water (40-60 degrees C.) and chilled water (7-10 degrees C.) to the fan coil units throughout the building. Either the heating or the cooling valve is opened on a particular FCU to satisfy that particular zone's needs. In each case both the chiller and the boiler are operating at partial load, but each must operate at their set-point temperature. Even if there is only a small demand, these set point temperatures are maintained. In the prior art, two set points must be maintained—approximately 7 degrees and approximately 50 degrees. In the present inventive system, a single water temperature of about 20 degrees is maintained.

FIGS. 23 and 24 compare the coefficient of performance for the inventive system against two prior art systems. FIG. 23 shows the comparison for operation in the cooling mode. The load range shows operations between 20% and 100% of maximum capacity. The vertical line shows the Integrated Part Load Value ("IPLV") average load. The upper curve 198 shows the coefficient of performance (COP) at various loads for the inventive micro chiller system. The middle curve 200 shows the COP for a chiller system that uses a compressor having magnetic bearing technology, such as marketed by Danfoss Turbocor of Tallahassee, Fla. The lower curve 202 shows the COP for a conventional chiller system using an air-cooled chiller. As the reader will observe, the inventive system has a higher COP for all loading levels, but the efficiency gains become more dramatic at lower loading levels. FIG. 24 shows the same comparison for the combined heating and cooling cycle. The reader will thereby understand that the present invention offers a significant efficiency advantage over the prior art.

Figure 25:
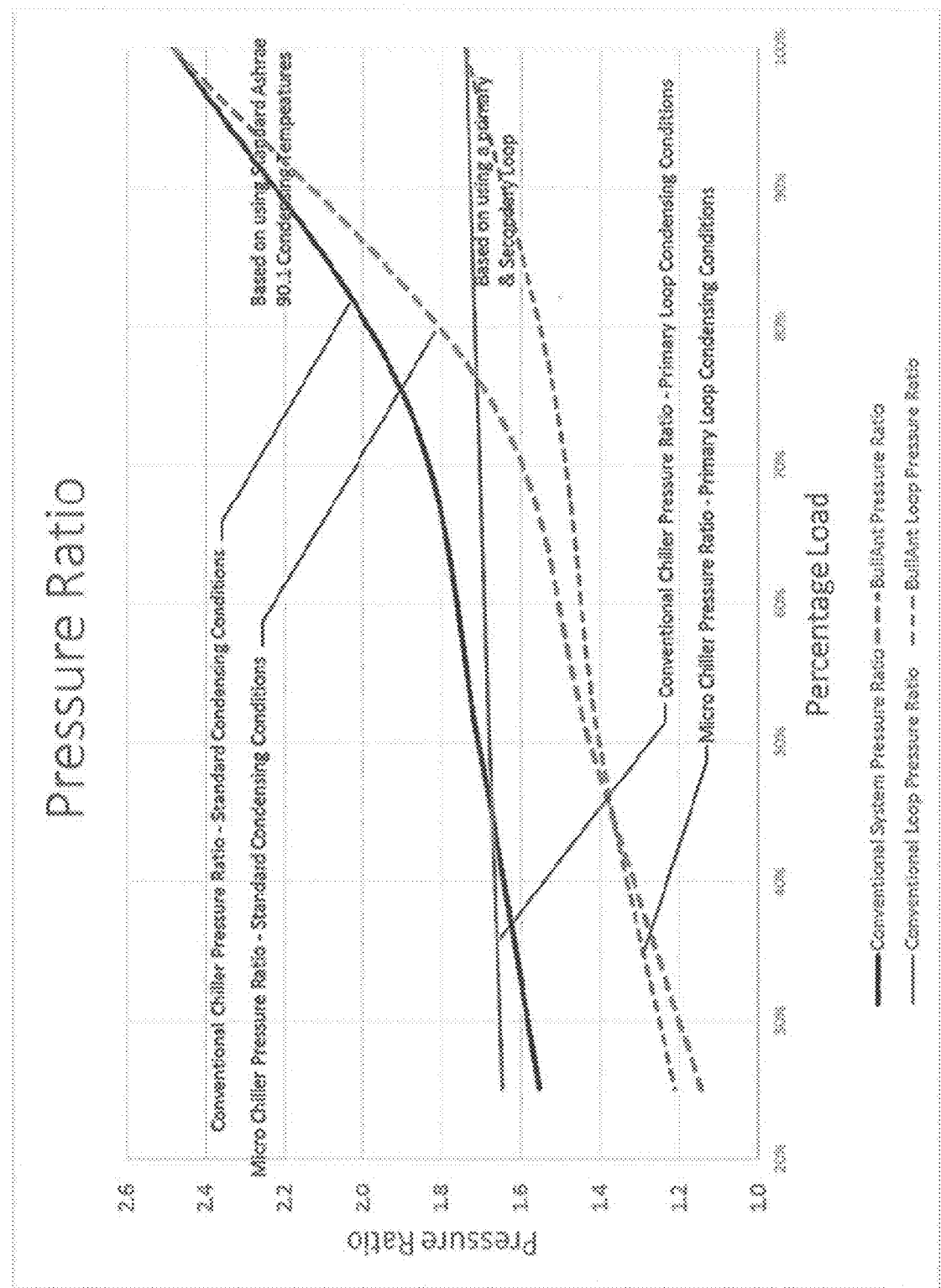
FIG. 25 is a plot of pressure ratios as a function of percentage load for the inventive system and for prior art systems.

FIG. 25 shows a plot of pressure ratios for the inventive micro chiller system in comparison to prior art systems. For the typical range of loads the inventive system uses a lower pressure ratio and therefore achieves higher efficiency. The plot shown is actually conservative and the advantage of the inventive system is generally greater than shown.

The invention encompasses many additional features and embodiments, which can be combined in countless ways. Additional exemplary features and embodiments include the following:

1. Water has been described as the preferred circulation medium but many other substances could be used in its place.

2. The embodiment of FIGS. 8-10 could be modified so that the refrigerant circulation is reversed but the water circulation in the secondary water loop remains constant. In this embodiment, the role of the two heat exchangers would be reversed via the changing of the direction of circulation of the refrigerant. A reversing valve (such as shown in FIG. 20) could be used for this purpose.

3. For embodiments using foil bearings in the compressor, it is desirable to never allow the compressor speed to fall below the "liftoff" speed of the foil bearing. In these cases the control system can set the compressor to run slowly while periodically reversing the water flow control valves so that heating and cooling modes are cycled and no net heating or cooling is applied to the air passing through the fan control units.

4. The insulation requirements for the PWL will be much less than prior art hot water and cold water loops, since the temperature of the water in the PWL will be close to the temperature of the air within the building.

5. The inventive Predictive Preemptive Automation Control Algorithm ("PPACA") predicts the future HVAC loads (over the near term) and predicts the energy pricing. In order to reduce the cost of operation, the PPACA has the ability to use the building as a "thermal battery." For example, the PPACA can reduce the temperature in the building below optimal during periods of cheap energy so that it can reclaim this "stored cooling" while running at a lower capacity during periods of expensive energy.

6. The PPACA can be set to give different HVAC zones in the building a different priority. Some zones can be set to maintain a desired temperature no matter the energy cost, whereas others can be allowed to vary more widely in order to economize. As an example, a hospital's surgical suites can be deemed "critical" so that the set temperature is maintained no matter what. The administrative offices in the same hospital building could be allowed to grow warmer during elevated cost periods.

7. In a conventional prior art system, the hot and cold water are kept at a constant temperature, and the water bypass valves are used to configure the flow of water through the various air handlers. The amount of water flowing through a particular air handler is set by the flow through a diversion or three way valve. These valves only allow enough water to go through the coil in a particular air handler to give it the amount of cooling or heating that it needs/The rest of the water bypasses the coil and connects back into the return line on the other side of the coil. This produces wasteful recirculation. In the present invention, the flow rate is fairly constant through the coil, and capacity is adjusted by varying the temperature of the water (rather than the water flow rate). This fact allows the present invention to operate at much higher efficiencies than the conventional method. This fact also allows the use of a lower pressure ratio in the micro chiller refrigeration circuit, which reduces the required compressor speed. Electrical energy consumption is reduced by a cubic rate if compressor speed is cut in half. A prior art chiller loading and unloading is controlled by either keeping the feed water or the return water at a constant temperature. Because the prior art system has to be able to handle an unpredictable full load condition at any air handler, most machines use the feed water temperature as the control point. In the present invention, loading and unloading is controlled on a zone-by-zone basis. Each micro chiller's capacity is controlled by the actual ambient temperature in the zone it controls. The closer the temperature in the space gets to the set point, then the slower the compressor runs, and the more efficient it becomes.

Although the preceding description contains significant detail, it should not be construed as limiting the scope of the invention but rather as providing illustrations of the preferred embodiments of the invention. Thus, the scope of the invention should be fixed by the claims ultimately presented rather than the examples given.

Having described my invention, I claim:

1. A method for controlling a temperature in a space within a building, comprising:
    (a) providing a fan unit having a liquid coil and a fan, with said fan configured to blow air over said liquid coil and into said space;
    (b) providing a microchiller including,
        (i) a compressor,
        (ii) a condenser,
        (iii) an expansion valve,
        (iv) an evaporator, and
        (v) a refrigerant circulation loop configured to circulate said refrigerant from said compressor to said condenser, to said expansion valve, to said evaporator, and back to said compressor;
    (c) providing a primary liquid loop running through said building;
    (d) providing a secondary liquid loop running between said microchiller and said fan unit;
    (e) maintaining said primary liquid loop between 18 degrees centigrade and 26 degrees centigrade;
    (f) providing a first set of valves controlling flow through said evaporator of said microchiller;
    (g) providing a second set of valves controlling flow through said condenser of said microchiller;
    (h) operating in a heating mode, said heating mode including setting said first set of valves to circulate liquid from said primary liquid loop through said evaporator and setting said second set of valves to circulate liquid from said secondary liquid loop through said condenser; and
    (i) operating in a cooling mode, said cooling mode including setting said first set of valves to circulate liquid from said secondary liquid loop through said evaporator and setting said second set of valves to circulate liquid from said primary liquid loop through said condenser.

2. The method for controlling a temperature in a space within a building as recited in claim 1, comprising maintaining said primary liquid loop between 20 degrees centigrade and 24 degrees centigrade.

3. The method for controlling a temperature in a space within a building as recited in claim 1, wherein said primary liquid loop and said secondary liquid loop contain water.

4. The method for controlling a temperature in a space within a building as recited in claim 1, wherein said first set of valves comprise a spool valve.

5. The method for controlling a temperature in a space within a building as recited in claim 4, wherein said second set of valves are contained within said spool valve.

6. The method for controlling a temperature in a space within a building as recited in claim 1, further comprising providing a second fan unit attached to said secondary liquid loop.

7. The method for controlling a temperature in a space within a building as recited in claim 1, further comprising unloading said compressor and periodically cycling said first set of valves and said second set of valves between a heating mode and a cooling mode.

8. A method for controlling a temperature in a space within a building, comprising:
    (a) providing a fan unit having a liquid coil and a fan, with said fan configured to blow air over said liquid coil and into said space;
    (b) providing a microchiller including,
        (i) a compressor,
        (ii) a condenser,
        (iii) an expansion valve,
        (iv) an evaporator, and
        (v) a refrigerant circulation loop configured to circulate said refrigerant from said compressor to said condenser, to said expansion valve, to said evaporator, and back to said compressor;
    (c) providing a primary liquid loop running through said building;
    (d) providing a secondary liquid loop running between said microchiller and said fan unit;
    (e) maintaining said primary liquid loop between 18 degrees centigrade and 26 degrees centigrade;
    (f) operating in a heating mode, said heating mode including circulating liquid from said primary liquid loop through said evaporator and circulating liquid from said secondary liquid loop through said condenser; and (g) operating in a cooling mode, said cooling mode including circulating liquid from said secondary liquid loop through said evaporator and circulating liquid from said primary liquid loop through said condenser.

9. The method for controlling a temperature in a space within a building as recited in claim 8, comprising maintaining said primary liquid loop between 20 degrees centigrade and 24 degrees centigrade.

10. The method for controlling a temperature in a space within a building as recited in claim 8, wherein said primary liquid loop and said secondary liquid loop contain water.

11. The method for controlling a temperature in a space within a building as recited in claim 8, wherein said flow through said evaporator is controlled by a spool valve.

12. The method for controlling a temperature in a space within a building as recited in claim 11, wherein said flow through said condenser is controlled by said spool valve.

13. The method for controlling a temperature in a space within a building as recited in claim 8, further comprising providing a second fan unit attached to said secondary liquid loop.

14. The method for controlling a temperature in a space within a building as recited in claim 8, further comprising unloading said compressor and periodically cycling said microchiller between a heating mode and a cooling mode.

15. A method of independently controlling a temperature within a first space in a building and a second space in said building, comprising:

(a) providing a first fan unit having a first liquid coil and a first fan, with said first fan configured to blow air over said first liquid coil and into said first space;

(b) providing a first microchiller including,
  (i) a first compressor,
  (ii) a first condenser,
  (iii) a first expansion valve,
  (iv) a first evaporator, and
  (v) a first refrigerant circulation loop configured to circulate said refrigerant from said first compressor to said first condenser, to said first expansion valve, to said first evaporator, and back to said first compressor;

(c) providing a primary liquid loop running through said building;

(d) providing a first secondary liquid loop running between said first microchiller and said first fan unit;

(e) providing a second fan unit having a second liquid coil and a second fan, with said second fan configured to blow air over said second liquid coil and into said second space;

(f) providing a second microchiller including,
  (i) a second compressor,
  (ii) a second condenser,
  (iii) a second expansion valve,
  (iv) a second evaporator, and
  (v) a second refrigerant circulation loop configured to circulate said refrigerant from said second compressor to said second condenser, to said second expansion valve, to said second evaporator, and back to said second compressor;

(g) providing a second secondary liquid loop running between said second microchiller and said second fan unit;

(h) maintaining said primary liquid loop between 18 degrees centigrade and 26 degrees centigrade;

(i) operating in a first heating mode, said first heating mode including circulating liquid from said primary liquid loop through said first evaporator and circulating liquid from said first secondary liquid loop through said first condenser;

(j) operating in a first cooling mode, said first cooling mode including circulating liquid from said first secondary liquid loop through said first evaporator and circulating liquid from said primary liquid loop through said first condenser;

(k) operating in a second heating mode, said second heating mode including circulating liquid from said primary liquid loop through said second evaporator and circulating liquid from said second secondary liquid loop through said second condenser; and (l) operating in a second cooling mode, said second cooling mode including circulating liquid from said second secondary liquid loop through said second evaporator and circulating liquid from said primary liquid loop through said second condenser.

16. The method for controlling a temperature in a space within a building as recited in claim 15, comprising maintaining said primary liquid loop between 20 degrees centigrade and 24 degrees centigrade.

17. The method for controlling a temperature in a space within a building as recited in claim 15, wherein said primary liquid loop and said secondary liquid loop contain water.

18. The method for controlling a temperature in a space within a building as recited in claim 15, wherein said flow through said evaporator is controlled by a spool valve.

19. The method for controlling a temperature in a space within a building as recited in claim 18, wherein said flow through said condenser is controlled by said spool valve.

* * * * *